US012683837B2

(12) United States Patent
Thoumy et al.

(10) Patent No.: US 12,683,837 B2
(45) Date of Patent: Jul. 14, 2026

(54) METHOD AND APPARATUS FOR SIMULTANEOUS MULTI-USER AND DIRECT LINK TRANSMISSION WITH REDUCED INTERFERENCES

(71) Applicant: CANON KABUSHIKI KAISHA, Tokyo (JP)

(72) Inventors: François Thoumy, Vignoc (FR); Stéphane Baron, Le Rheu (FR); Mickaël Lorgeoux, Rennes (FR); Brice Le Houerou, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 325 days.

(21) Appl. No.: 18/255,817

(22) PCT Filed: Nov. 29, 2021

(86) PCT No.: PCT/EP2021/083430
§ 371 (c)(1),
(2) Date: Jun. 2, 2023

(87) PCT Pub. No.: WO2022/117521
PCT Pub. Date: Jun. 9, 2022

(65) Prior Publication Data
US 2024/0015055 A1      Jan. 11, 2024

(30) Foreign Application Priority Data

Dec. 4, 2020    (GB) ...................................... 2019187

(51) Int. Cl.
H04L 1/18 (2023.01)
H04B 7/0452 (2017.01)
(Continued)

(52) U.S. Cl.
CPC ...... H04L 25/03343 (2013.01); H04L 5/0032 (2013.01); H04W 76/14 (2018.02); H04W 76/15 (2018.02)

(58) Field of Classification Search
CPC ..... H04W 72/04; H04W 72/12; H04W 74/00; H04W 52/18; H04W 74/08; H04W 76/14;
(Continued)

(56) References Cited

U.S. PATENT DOCUMENTS 10,334,475 B2 * 6/2019 Xi .......................... H04L 1/1861
10,568,119 B2 * 2/2020 Oteri .................... H04B 7/0452
(Continued)

FOREIGN PATENT DOCUMENTS

CN        107079476 A      8/2017
CN        107925533 A      4/2018
(Continued)

OTHER PUBLICATIONS

Dibakar Das (Intel): "EHT Direct Link Transmission", IEEE Draft; 11-19-1604-01-00BE-EHT-DIRECT-LINK-TR Ansmission, IEEE-SA Mentor, Piscataway, NJ USA, vol. 802.11 EHT; 802.11 be, No. 1; Jan. 14, 2020 (Jan. 14, 2020), pp. 1-14, XP068165219, (Year: 2020).*

(Continued)

*Primary Examiner* — Edan Orgad
*Assistant Examiner* — Vanneilian Lalchinthang
(74) *Attorney, Agent, or Firm* — Canon U.S.A., Inc. IP Division

(57)        ABSTRACT

The present invention concerns a transmission system where DiL and MU UL scheme are triggered by the AP simultaneously. According to a first aspect of the invention, the data frame sent in DiL mode by a station in response to an AP triggering frame are emitted according to the synchronization scheme adopted in MU scheme. This means that pre-
(Continued)

(Source STA)

correction parameters are computed based on the triggering frame from the AP for the transmission of the data frame. According to a second aspect of the invention, the return frame from the destination station of a DiL transmission to the source station, typically an acknowledge frame, when present, is transmitted using pre-correction parameters computed by the destination of the DiL transmission. These pre-correction parameters may be computed based on the received data frame from the source station of the DiL transmission or, when available, based on a previous frame received from the AP.

14 Claims, 11 Drawing Sheets

(51) Int. Cl.

| | |
|---|---|
| *H04L 5/00* | (2006.01) |
| *H04L 25/03* | (2006.01) |
| *H04W 52/18* | (2009.01) |
| *H04W 72/12* | (2023.01) |
| *H04W 76/14* | (2018.01) |
| *H04W 76/15* | (2018.01) |

(58) Field of Classification Search
CPC . H04W 76/15; H04W 72/1252; H04W 84/12; H04W 4/70; H04W 72/02; H04W 72/121; H04W 92/18; H04W 74/04; H04L 25/03343; H04L 1/1819; H04L 1/1614; H04L 1/0008; H04L 5/0032; H04L 5/0055; H04L 27/0014; H04L 1/0061; H04L 1/1835; H04B 7/0452
USPC ......................................................... 370/328
See application file for complete search history.

(56) References Cited

U.S. PATENT DOCUMENTS

| | | | |
|---|---|---|---|
| 2017/0164387 A1* | 6/2017 | Lou ........................ | H04W 74/04 |
| 2018/0007712 A1* | 1/2018 | Lou ........................ | H04B 7/0452 |
| 2020/0336254 A1* | 10/2020 | Chu ........................ | H04L 1/1893 |
| 2020/0404683 A1* | 12/2020 | Houghton ............. | H04W 72/23 |
| 2021/0051722 A1* | 2/2021 | Huang ................. | H04L 27/2692 |
| 2022/0302963 A1* | 9/2022 | Garcia Rodriguez ...................... H04B 7/0617 |

FOREIGN PATENT DOCUMENTS

| | | |
|---|---|---|
| CN | 109315013 A | 2/2019 |
| GB | 2595517 A | 12/2021 |
| WO | 2020011684 A1 | 1/2020 |

OTHER PUBLICATIONS

Youhan Kim (Qualcomm): "CR on Clause 17", IEEE Draft; 11-19-0830-00-00AX-CR-ON-CLAUSE-17, IEEE-SA Mentor, Piscataway, NJ USA, vol. 802.11 ax May 10, 2019 (May 10, 2019), pp. 1-5, XP068159931 (Year: 2019).*
Dibakar Das (Intel); "Triggered P2P"; IEEE 802.11-19/16044r1; Nov. 2019; Retrieved from the Internet: URL: https://mentor.ieee. org/802.11/dcn/19/11-19-1604-01-00be-eht-direct-link-transmission. pptx; (Retrieved on Jan. 14, 2020); pp. 1-14.
Youhan Kim (Qualcomm); "CR on Clause 17"; IEEE 802.11-19/0830r0; May 2019; Retrieved from the Internet: URL:https://mentor. ieee.org/802.11/dcn/19/11-19-0830-00-00ax-cr-on-clause-17.docx; (Retrieved on May 10, 2019); pp. 1-5.
Dibakar Das, et al., Triggered P2P, IEEE 802.11-19/1604r1, Jan. 13, 2020, pp. 1-14.

* cited by examiner

350

| B0          | B4 | B5   | B12     | B13   | B17      | B18  | B22        | B23   | B24 | B25      |
| UL Data Symbols | | RU Allocation | | AP Tx Power | | UL Target RSSI | | UL HE-MCS | | Reserved |

Bits:        5              8              5              5              2          1

351          352                                          353        354

| L-STF | L-LTF | L-SIG | RL-SIG | HE-SIG-A |

Pre-HE modulated fields 400a

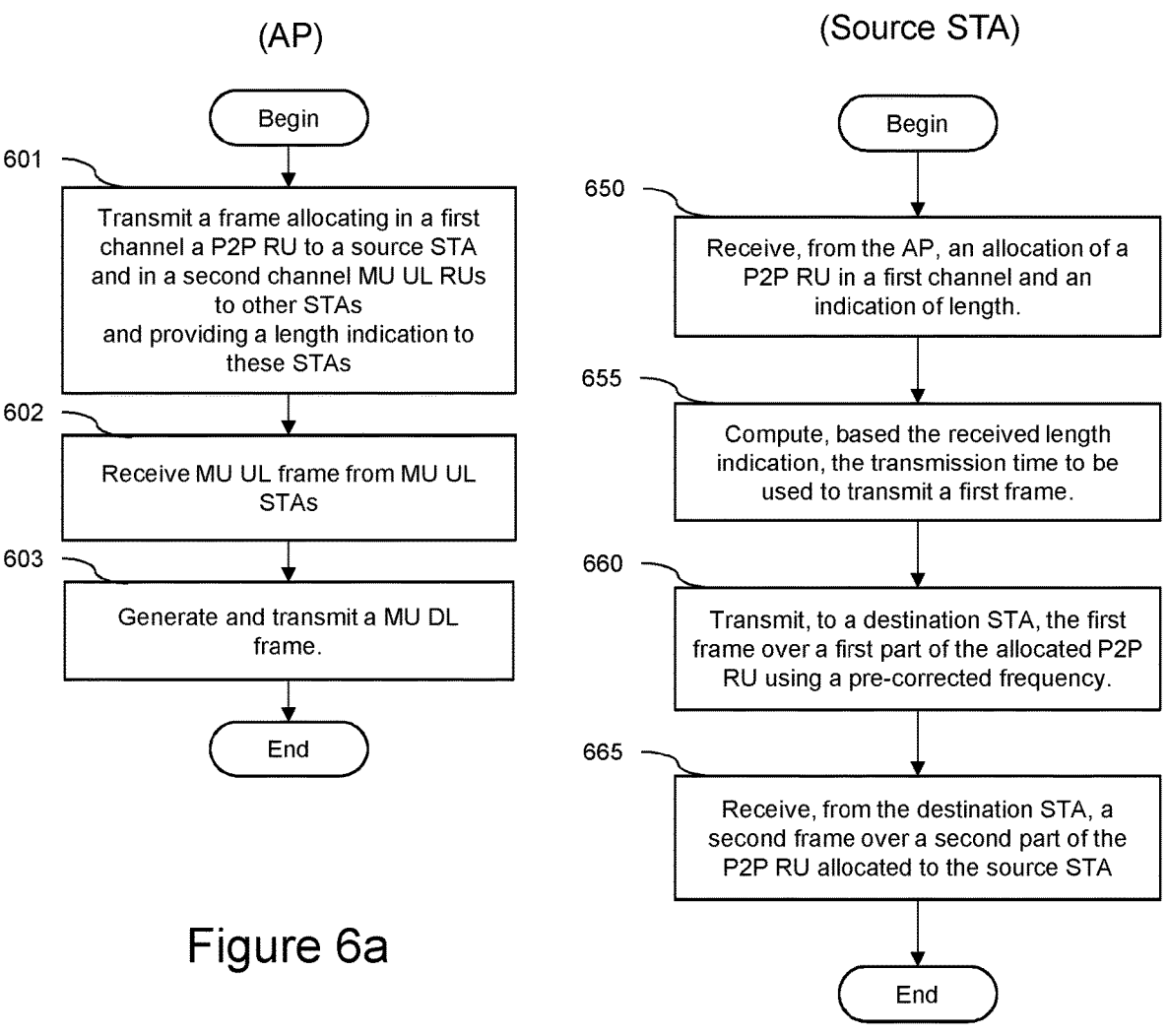

(AP)

Begin

601

Transmit a frame allocating in a first channel a P2P RU to a source STA and in a second channel MU UL RUs to other STAs and providing a length indication to these STAs

602

Receive MU UL frame from MU UL STAs

603

Generate and transmit a MU DL frame.

End

Figure 6a (Source STA)

Begin

650

Receive, from the AP, an allocation of a P2P RU in a first channel and an indication of length.

655

Compute, based the received length indication, the transmission time to be used to transmit a first frame.

660

Transmit, to a destination STA, the first frame over a first part of the allocated P2P RU using a pre-corrected frequency.

665

Receive, from the destination STA, a second frame over a second part of the P2P RU allocated to the source STA End

Figure 6b (Dest STA)

METHOD AND APPARATUS FOR SIMULTANEOUS MULTI-USER AND DIRECT LINK TRANSMISSION WITH REDUCED INTERFERENCES

CROSS-REFERENCE TO RELATED APPLICATIONS

This application is the National Phase application of PCT Application No. PCT/EP2021/083430, filed on Nov. 29, 2021 and titled "METHOD AND APPARATUS FOR SIMULTANEOUS MULTI-USER AND DIRECT LINK TRANSMISSION WITH REDUCED INTERFERENCES". This application claims the benefit under 35 U.S.C. § 119(a)-(d) of United Kingdom Patent Application No. 2019187.0, filed on Dec. 4, 2020 and entitled "METHOD AND APPARATUS FOR SIMULTANEOUS MULTI-USER AND DIRECT LINK TRANSMISSION WITH REDUCED INTERFERENCES". The above cited patent applications are incorporated herein by reference in their entireties.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth and decreasing latency requirements that are demanded for wireless communications systems in high-density environments, multi-user (MU) schemes are being developed to allow a single access point (AP) to schedule MU transmissions, i.e. multiple simultaneous transmissions to or from non-AP stations, in the wireless network. For example, one of such MU schemes has been adopted by the Institute of Electrical and Electronics Engineers (IEEE) in the 802.11ax standard, draft version 7.0 (D7.0) of November 2020.

Thanks to the MU feature, a station has the opportunity to gain access to the wireless medium via two access schemes: the MU scheme and the conventional Enhanced Distributed Channel Access—EDCA scheme, referred to as single user (SU) scheme.

The IEEE (registered trademark) 802.11ax standard allows a MU downlink (DL) transmission to be performed by the AP where the latter can perform multiple simultaneous elementary transmissions, over so-called resource units (RUs), to various non-AP stations. As an example, the resource units split a communication channel of the wireless network in the frequency domain, based for instance on Orthogonal Frequency Division Multiple Access (OFDMA) technique. The assignment of the RUs to the stations is signaled at the beginning of the MU Downlink frame, by providing an association identifier (AID) of a non-AP station (a 16-bit Association Identifier, AID, individually obtained by each station during its association procedure with the AP) for each RU defined in the transmission opportunity.

The 802.11ax standard also allows a MU uplink (UL) transmission to be triggered by the AP, where various non-AP stations can simultaneously transmit to the AP over the resource units forming the MU UL transmission. To control the MU UL transmission by the non-AP stations, the AP sends a control frame, known as a Trigger Frame (TF), by which it allocates the resource units to the non-AP stations using the 16-bit Association IDentifiers (AIDs) assigned to them upon registration to the AP and/or using reserved AIDs designating a group of non-AP stations. As multiple non-AP stations simultaneously transmit during the MU UL transmission, an appropriate synchronization is required to take full benefit of the orthogonality of the OFDM symbols.

The 802.11ax requirements in terms of synchronization mandate:

that the participating non-AP stations start their transmission of the UL signal after a specified time interval SIFS (short interframe space) of 16 μs±400 ns after the end of the trigger frame. This is a timing compensation; and that the participating non-AP stations pre-compensate for carrier frequency offset (CFO) error, based on the trigger frame, in such a way a residual CFO error after compensation remains less than 350 Hz from a transmit center frequency of the AP.

These CFO and symbol clock error compensation with respect to the trigger frame guarantee that the simultaneous transmissions of the non-AP stations are synchronized in time and are orthogonal (orthogonality is kept between the resource units used by the various non-AP stations), thus allowing the AP to correctly receive and decode the OFDMA symbols and frames.

The adopted 802.11ax MU transmission scheme is not adapted to bandwidth-demanding communication services, e.g. video-based services such as gaming, virtual reality, streaming applications between non-AP stations. This is because all the communications go through the AP, thereby doubling the air time for transmission between the non-AP stations but also doubling the number of medium accesses, hence the medium access time, and also doubling the radio resources needed for the transmission.

The Single User (SU) scheme of 802.11 network protocol allows a direct link (DiL, also called peer-to-peer (P2P) transmission) between two non-AP stations to be performed without involving the AP, wherein the data (MAC) frames are addressed using the 48-bit IEEE MAC address of the destination non-AP station.

However, SU and MU schemes directly compete one against the other to gain access to the wireless medium (by the AP for MU schemes, by a non-AP station for the SU scheme). In high density environments, this competition generates a large amount of undesirable collisions, thereby degrading latency and overall useful data throughput.

Recent discussions within the IEEE 802.11be draft standard Task Group contemplate integrating DiL transmissions under the global policy of the AP's scheduling, hence allowing MU UL transmissions and P2P transmissions to be triggered simultaneously by the AP, for instance on adjacent channels. The drawbacks of the above competition between SU and MU schemes therefore drastically reduce: an improvement of spectrum efficiency, latency and overall useful data throughput is obtained.

However, the simultaneous MU UL and P2P transmissions from multiple (usually non-AP) stations on adjacent channels face interference issues, in particular with respect to the orthogonality of the signals simultaneously transmitted by the multiple stations.

It is thus desirable to design more efficient mechanisms to allow simultaneous MU UL and P2P transmissions on adjacent channels that limit, reduce, and even avoid, channel interference.

SUMMARY OF THE INVENTION

The present invention has been devised to address one or more of the foregoing concerns. It concerns a transmission system where DiL and MU UL frames are triggered by the AP simultaneously. According to a first aspect of the invention, the data frame sent in DiL mode by a station in response to an AP triggering frame is emitted according to the synchronization mode adopted in MU UL scheme. This means that, for the transmission of the DiL data frame, pre-correction parameters are computed based on the triggering frame received from the AP. According to a second aspect of the invention, the return frame from the destination station of a DiL transmission to the source station, typically an acknowledge frame, when present, is transmitted using pre-correction parameters computed by the destination of the DiL transmission. These pre-correction parameters may be computed based on the received data frame from the source station of the DiL transmission or, when available, based on a previous frame received from the AP.

According to a first aspect of the invention there is provided a communication method in a wireless network, at a peer-to-peer source station:

receiving from an access point a triggering frame reserving a transmission opportunity, the triggering frame allocating a first resource unit to the peer-to-peer source station for a direct link communication with a peer-to-peer destination station, the triggering frame further allocating at least one second resource unit for uplink communication to at least one station in multi user mode;

transmitting to the peer-to-peer destination station a frame on the first resource unit;

wherein the method further comprises:

computing pre-correction parameters based on the received triggering frame from the access point; and applying the pre-correction parameters when transmitting to the peer-to-peer destination station the frame on the first resource unit.

According to another aspect of the invention there is provided a communication method in a wireless network, at a peer-to-peer destination station:

receiving from a peer-to-peer source station a first frame;

transmitting to the peer-to-peer source station a second frame; wherein the method further comprises:

computing pre-correction parameters based on a previously received frame; and applying the pre-correction parameters when transmitting to the peer-to-peer source station the second frame.

In an embodiment, the previously received frame is the first frame received from the peer-to-peer source station.

In an embodiment:

the peer-to-peer destination station is within the radio range of an access point to which the peer-to-peer source station is connected; and the previously received frame is a frame received from the access point.

In an embodiment, the previously received frame is the last received frame from the access point.

In an embodiment, the pre-correction parameters applied when transmitting to the peer-to-peer source station the second frame are:

pre-correction parameters computed based on a previously received frame from the access point when available; and pre-correction parameters computed based on the first frame received from the peer-to-peer source station otherwise.

In an embodiment, the pre-correction parameters are related to the transmit center frequency and symbol clock frequency error compensation.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

According to another aspect of the invention there is provided a computer program which upon execution causes the method of the invention to be performed.

According to another aspect of the invention there is provided a communication device in a wireless network, working as a peer-to-peer source station, the communication device comprising a processor configured for:

receiving from an access point a triggering frame reserving a transmission opportunity, the triggering frame allocating a first resource unit to the peer-to-peer source station for a direct link communication with a peer-to-peer destination station, the triggering frame further allocating at least one second resource unit for uplink communication to at least one station in multi user mode;

transmitting to the peer-to-peer destination station a frame on the first resource unit;

wherein the method further comprises:

computing pre-correction parameters based on the received triggering frame from the access point; and applying the pre-correction parameters when transmitting to the peer-to-peer destination station the frame on the first resource unit.

According to another aspect of the invention there is provided a communication device in a wireless network, working as a peer-to-peer destination station, the communication device comprising a processor configured for:

receiving from a peer-to-peer source station a first frame;

transmitting to the peer-to-peer source station a second frame;

wherein:

computing pre-correction parameters based on a previously received frame; and applying the pre-correction parameters when transmitting to the peer-to-peer source station the second frame.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 6a and FIG. 6b illustrate using a flowchart an example of a wireless communication method performed by an AP and a P2P source STA according to embodiments of the invention;

DETAILED DESCRIPTION OF THE INVENTION

The present invention generally relates to wireless communications.

A triggering frame in a wireless network grants a medium to an AP for a TXOP. The triggering frame allocates Uplink, UL, RUs to UL transmissions for an UL duration and Direct Link, DiL, resources units, RUs, to peer-to-peer, P2P, transmissions, where the DiL RUs are adjacent, in frequency, to the UL RUs.

In the following description, each frame consists of a preamble part and a data payload part. Although the preamble part is not depicted in all the Figures, it is shown as a black portion at the beginning of each frame of the Figures from frequency perspective (i.e. FIGS. 2b, 2d, 4b, 5b). Each preamble is advantageously transmitted over the whole corresponding 20 MHz channel, while the data may be transmitted over a subpart thereof, typically an RU.

Figure 1:
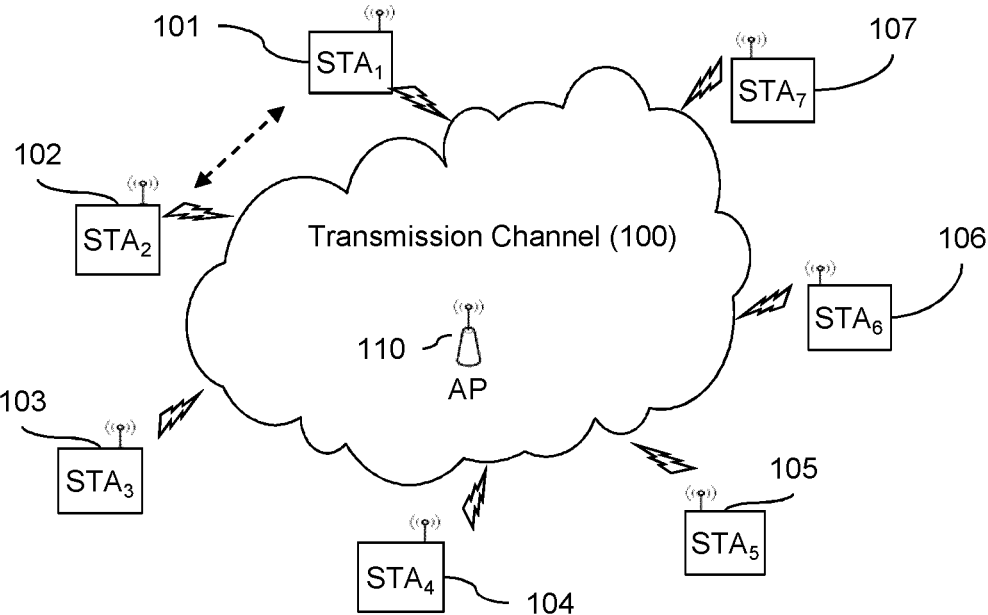
FIG. 1 illustrates a typical wireless communication system in which embodiments of the invention may be implemented.

FIG. 1 illustrates a wireless communication system in which several communication stations 101-107, 110 exchange data frames over a radio transmission channel 100 of a wireless local area network (WLAN). A central station, namely access point (AP) 110, may manage a basic service set (BSS) of the wireless system. More than one BSS may be managed by an AP if it implements virtual APs. The radio transmission channel 100 is defined by an operating frequency band (OFB) constituted by a single channel or a plurality of channels forming a composite channel.

An exemplary situation of direct communications, corresponding to an increasing trend nowadays, is the presence of peer-to-peer (P2P) transmissions in between non-AP stations, e.g. STA 102 and STA 101 illustrated in the Figure. Technologies that support P2P transmissions are for example WiFi-Miracast® or Wireless Display scenario, or Tunneled Direct Link Setup (TDLS). Note that even if P2P flows are usually not numerous, the amount of data per flow may be huge (typically low-compressed video, from 1080p60 up to 8K UHD resolutions).

Each of STAs 101-107 may associate with AP 110 during an association procedure. During the association procedure, AP 110 assigns a specific Association IDentifier (AID) to the requesting STA. For example, the AID is a 16-bit value uniquely identifying the STA.

For P2P transmissions, both P2P non-AP stations are not necessarily registered within the AP's BSS. For example, P2P STA 101 may be registered within the BSS managed by AP 110 while P2P STA 102 is registered within the same BSS managed by AP 110. In a variant, P2P STA 102 may not yet be registered within the same BSS managed by AP 110.

The stations 101-107, 110 may compete one against each other using EDCA (Enhanced Distributed Channel Access) contention, to access the wireless medium in order to be granted a transmission opportunity (TXOP) and then transmit (single-user, SU) data frames.

The stations may also use a multi-user (MU) scheme in which a single station, usually AP 110, is allowed to schedule a MU transmission, i.e. allowing multiple simultaneous transmissions to or from other stations, in the wireless network. One implementation of such a MU scheme has been for example adopted in IEEE 802.11ax amendment standard, as the Multi-User Uplink and Downlink OFDMA (MU UL and DL OFDMA) procedures.

Figures 2A, 2B:
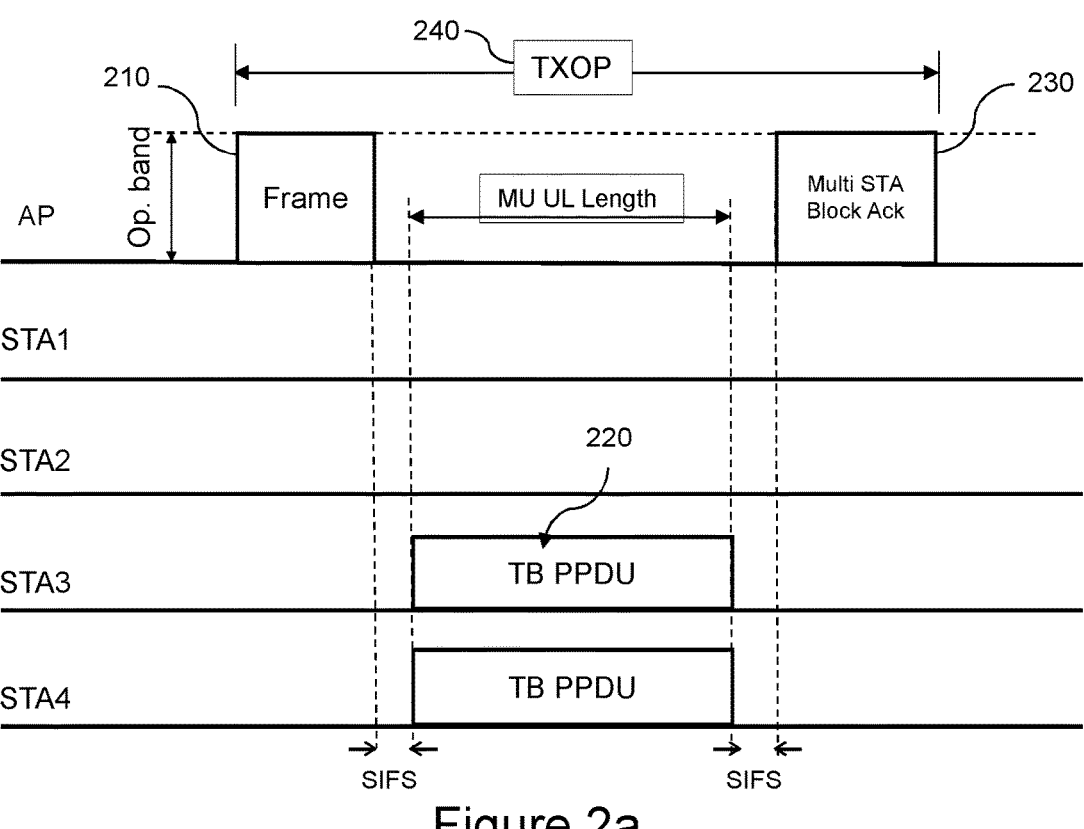
FIGS. 2a and 2b illustrate a conventional trigger-based (TB) MU UL OFDMA transmission with acknowledgment according to 802.11ax.

The FIGS. 2a and 2b illustrate, respectively from stations and operating frequency band perspectives, a conventional trigger-based (TB) MU UL OFDMA transmission with acknowledgment according to 802.11ax.

To perform such MU UL transmission, the 802.11ax standard splits a granted communication channel into resource units (RUs) that are shared in the frequency domain by the multiple stations based on Orthogonal Frequency Division Multiple Access (OFDMA) technique.

The OFDM technique is largely deployed in today wireless communication networks to improve the spectrum efficiency given the increasing number of users and throughput needs while the frequency resources remain limited. In OFDM, the use of orthogonal subcarriers allows a high number of closely spaced subcarriers to be defined in the available bandwidth, resulting in an increase of spectral efficiency.

The orthogonality requires that the subcarrier spacing where the peak in the spectrum amplitude of a given subcarrier is line up with the nulls of the other subcarriers. As a result, each subcarrier can be decoded without interference from neighboring subcarriers.

As long as orthogonality is respected between the subcarriers within a same frequency channel and also between the subcarriers of adjacent channels within the operating frequency band, no interference issue will happen and the OFDM signal can be correctly decoded by a receiving station.

On the contrary, a lack of orthogonality will result in interferences between the subcarriers within the same frequency channel and also between the subcarriers of adjacent channels within the operating frequency band. When different stations are transmitting on adjacent RUs, a fine synchronization between the emitting stations has to be provided to ensure the orthogonality property.

The example of the Figure shows a granted operating band made of a single MHz channel, i.e. 242 frequency tones. MU UL OFDMA of course applies to wider granted operating bands, for instance of 40 MHz, 80 MHz, 80+80 MHz and 160 MHz-width.

As shown in the Figures, to finely control the MU UL transmissions by the non-AP stations 103 (STA3) and 104 (STA4), AP 110 sends a so-called triggering frame 210 (as defined in 802.11ax) which reserves the operating band fora duration known as transmission opportunity TXOP 240 and defines how the granted channel is split into RUs (here below UL RUs) and which non-AP station is allowed to transmit over each RU (i.e. to which non-AP station is allocated each RU).

The triggering frame is 20 MHz wide (preamble and data) and may be duplicated over several 20 MHz channels should the triggering frame defining RUs over these several 20 MHz channels.

The RUs may have various size, for instance as defined in Table 27-26 of the 802.11ax standard.

Triggering frame 210 further defines the UL duration 250 ("MU UL Length" on the FIG. 2a) during which the assigned non-AP stations can transmit UL frames.

Triggering frame 210 may either be a trigger frame or be a data or control frame including a trigger resource scheduling (TRS) subfield as defined in the 802.11ax standard.

Figure 3A:
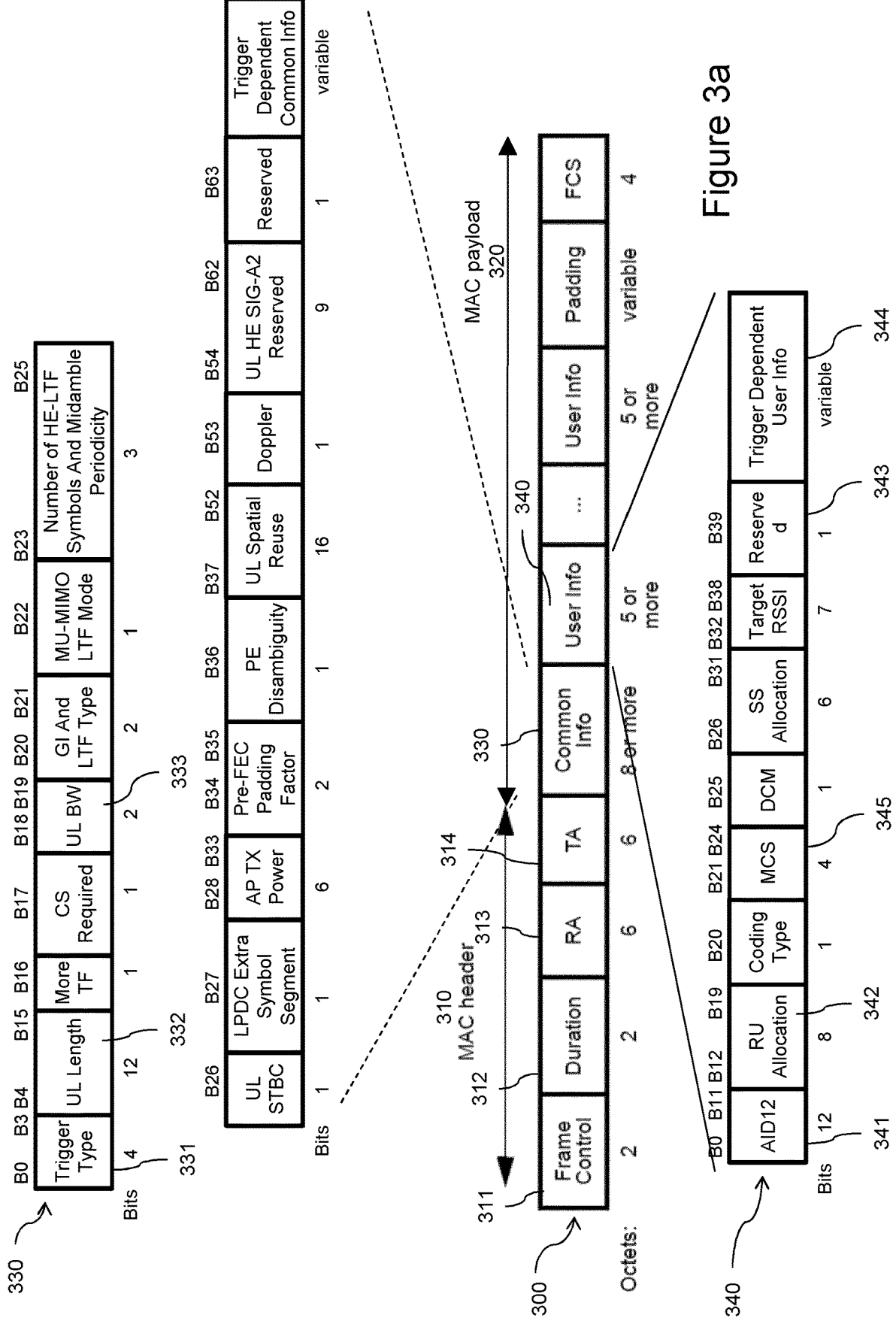
FIG. 3a illustrates the format of a trigger frame as described in the 802.11ax standard to perform MU UL OFDMA transmissions.

FIG. 3a illustrates the format of a trigger frame as described in the 802.11ax standard to perform MU UL OFDMA transmissions.

It is a MAC (standing for Medium Access Control) frame 300 made of:
a MAC header 310 with a standardized "Frame Control" field 311, a standardized "Duration" field 312 defining the duration of TXOP 240, an "RA" field 313 set to a broadcast MAC address, and a "TA" field set to a MAC address 314 of the AP transmitting the trigger frame, and
a MAC payload 320.
The MAC payload 320 includes:
a single "Common Info" field 330,
one or more "User Info" fields 340, and
padding and FCS fields.
The "Common Info" field 330 comprises a "Trigger Type" subfield 331 which specifies the type of the trigger frame. For instance, a basic TF is signaled by a value 0 in the "Trigger Type" subfield 331.

The "Common Info" field 330 also comprises a "UL Length" field 332 specifying the duration of the solicited UL transmission "MU UL Length" 250, and a 2-bit "UL BW" field 333 specifying the bandwidth of the operating band considered, e.g. BW=0 to define a 20 MHz bandwidth, BW=1 for a 40 MHz bandwidth, BW=2 for an 80 MHz bandwidth, BW=3 for an 80+80 MHz or 160 MHz bandwidth.

Each "User Info" field 340 corresponds to one of the RUs defined by TF 300. Any order of the "User Info" fields 340 can be used within TF 300 because these fields are self-sufficient to define the RUs and their access schemes.

A "User Info" field 340 includes an "AID12" subfield 341, an "RU Allocation" subfield 342 and ends with a reserved B39 bit 343 and a "Trigger Dependent User Info" subfield 344 of variable length, the content of which provide details on communication parameters and depends on the "Trigger Type" subfield 331. Other fields exist that are not explained herewith for concision.

The "AID12" subfield 341 is set to the AID (12 LSBs of the AID) of the non-AP station to which the RU defined in "RU Allocation" subfield 342 is allocated in case of scheduled access or is set to AID=0 or 2045 to offer the corresponding RU to random access to respectively associated and unassociated non-AP stations. The 802.11ax standard (Table 9-31i of version D7.0 of the standard for instance) defines the values to be used in "RU Allocation" subfield 342 to designate a specific RU (location of the DiL RU within the operating frequency band within the operating band signaled in "UL BW" field 333).

As mentioned above, a variant to a trigger frame is a data or control frame including a trigger resource scheduling (TRS) subfield as defined in the 802.11ax standard. The TRS control subfield may be added in the A-Control field of each HE PPDU sent by the AP to the non-AP stations (i.e. it is added in addition to data themselves). As the data or control frame is intended for a specific non-AP station, the latter knowns (without the need of an AID12 subfield) that the TRS subfield is addressed to it. Preferably, the data or control frames for various non-AP stations are sent by the AP using the MU DL scheme, in such a way the non-AP stations simultaneously receive their frame.

Figure 3B:
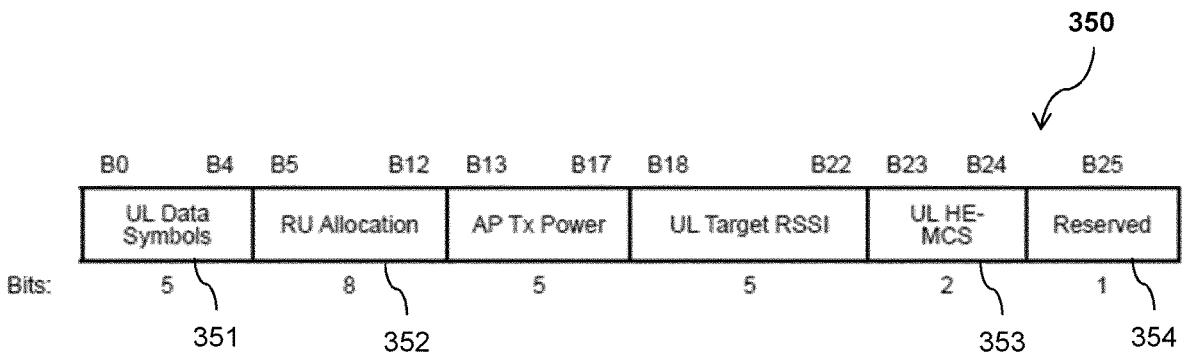
FIG. 3b illustrates the format of TRS subfield as described in the 802.11ax standard to perform MU UL OFDMA transmissions.

The TRS subfield is illustrated in FIG. 3b; it contains all indications needed by an addressed non-AP station to identify its allocated UL RU and then transmit a HE TB PPDU 220 in the next MU UL transmission 250, without having to EDCA-access the medium. The MU UL transmission 250 is for instance triggered a SIFS (Short Inter Frame Space) after the reception of the HE PPDU comprising the TRS subfield from the AP.

As shown in FIG. 3b, TRS subfield 350 according to 802.11ax includes an UL Data Symbols subfield 351 and a RU allocation subfield 352 defining the UL RU to be used to transmit a HE TB PPDU 220 in the next MU UL transmission. The UL Data Symbols subfield indicates the number of OFDM symbols in the Data field of the HE TB PPDU 220 and is set to the number of OFDM symbols minus 1. The other parameters of TRS subfield 350 are used to indicate the modulation (MCS) 353 and transmission power (based on the expected RSSI at AP side) to be used for the AP. Bit B25 (354) is currently not used.

In the example shown in FIGS. 2a and 2b, triggering frame 210 assigns UL RU 260 to STA3 and UL RU 270 to STA4. The assignment is made using the AIDs of the non-AP stations.

Upon receiving triggering frame 210, each non-AP station determines whether it is assigned one UL RU, thanks to its own AID. Next, each non-AP station to which an UL RU is assigned can start transmitting MU UL frames 220 (known as HE TB PPDU) over its assigned UL RU towards the AP after triggering frame 210. Due to the triggering mechanism, the terms "trigger-based MU UL transmission" are used.

To keep orthogonality between the signals transmitted by the assigned non-AP stations during the UL duration 250, the latter perform carrier frequency offset and timing compensations. This ensures synchronization between them. As specified in the 802.11ax standard for the transmission of HE TB PPDUs 220, the assigned non-AP stations must transmit with a residual CFO error within a ±350 Hz window from the transmit center frequency of the AP and the transmission start time must remain within a SIFS ±0.4 μs window from the end of triggering frame 210.

The nominal frequency is the frequency generated by the reference oscillator of the station. If no correction is applied, it determines the nominal transmit center frequency of the station as well as its nominal symbol clock frequency. When a pre-correction of the frequency is applied, the pre-correction enables to get a transmit center frequency and a symbol clock frequency close to the nominal transmit center frequency and nominal symbol clock frequency of the station used as reference for the pre-correction computation (for instance, ±350 Hz from AP's nominal transmit frequency for the transmission of HE TB PPDUs).

Figure 3C:
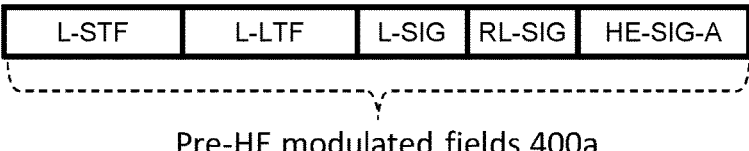
FIG. 3c illustrates the starting portion or preamble of HE PPDUs.

To do compensations, any station has to compute pre-correction parameters. This is made based on the preamble of a frame received. FIG. 3c illustrates the beginning of each frame (pre-HE modulated preamble portion), whatever its format: HE SU PPDU, HE MU PPDU (which includes one additional field in the pre-HE modulated preamble portion) and HE TB PPDU.

The station uses the preamble parts L-STF, L-LTF of the frame received (triggering frame from the AP in the example above) to detect the packet, to tune the automatic gain control, to estimate the frequency offset and the time synchronization. This leads to the determination of the pre-correction parameters.

The station then applies the pre-correction parameters in particular to align the transmit center frequency of the station to the transmit center frequency used by the AP to transmit its frame.

In the example shown, STA3 transmits its HE TB PPDU 220 over UL RU 260 and STA4 transmits its HE TB PPDU 220 over UL RU 270. They use a pre-correction of their nominal frequency with respect to triggering frame 210 received from AP 110. It is to be noted that STA3 and STA4 starts emitting the same preamble (block portion on the Figure) over the entire 20 MHz channel (which preambles thus superimpose one on each other) before transmitting the data over their allocated UL RU only.

Thanks to these pre-corrections, the parallel transmissions of STA3 and STA4 are synchronized in time, and the orthogonality is kept between their respective UL RUs 260 and 270. As a result, no interference issue happens during the parallel transmission of the two HE TB PPDUs by STA3 and STA4 and AP 110 is then able to decode correctly the received MU frames 220.

After the parallel transmission of the two HE TB PPDUs 220 by STA3 and STA4 (a SIFS after), AP 110 sends a multi-station (M-STA) block ack (BA) frame 230 to acknowledge the reception of the HE TB PPDUs 220.

AP 110 transmits triggering frame 210 and the multi-station block ack frame 230 on the overall operating frequency band, i.e. 20 MHz in this example, based on the nominal frequency of its internal reference clock. As specify in the 802.11ax standard, the tolerance on this nominal frequency is ±20 ppm (parts-per-million) in the 5 GHz and 6 GHz bands.

Figures 2C, 2D:
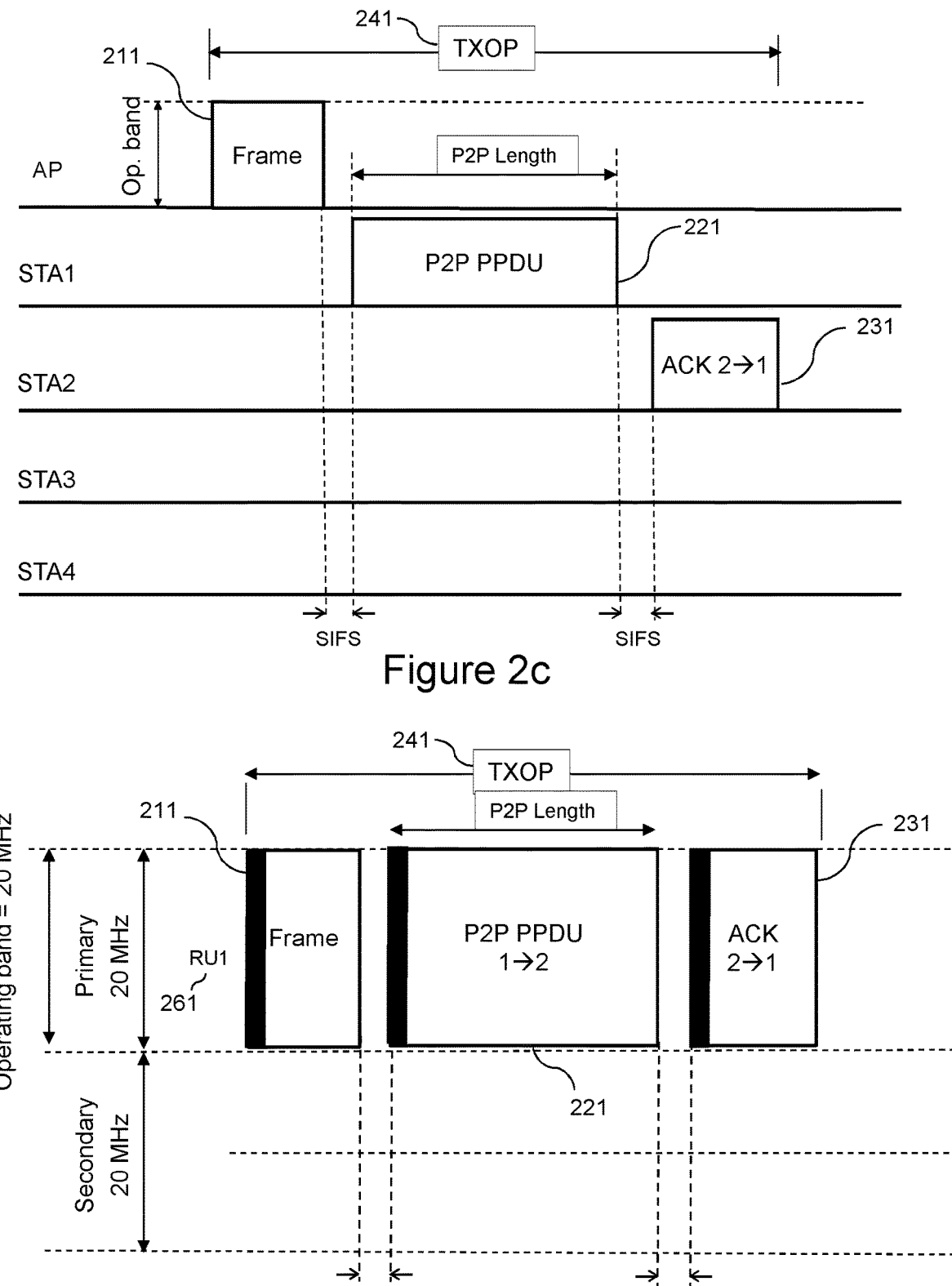
FIGS. 2c and 2d illustrate a trigger-base (TB) P2P transmission with acknowledgment during a transmission opportunity (TXOP) according to discussion related to future evolution of 802.11 standard.

FIGS. 2c and 2d illustrate, respectively from stations and operating frequency band perspectives, a trigger-based (TB) P2P transmission with acknowledgment as contemplated in the works of the IEEE 802.11be draft standard Task Group.

In order to further address the issue of increasing bandwidth and decreasing latency requirements that are demanded for wireless communications systems in high-density environments, some proposals within the 802.11be working group seek to efficiently vary the transmissions allowed in a triggered MU transmission.

In this context, some proposals provide features allowing Direct Link (DiL), also referred to as peer-to-peer (P2P), transmissions to be scheduled in a MU transmission and efficiently managed. The management is seen to be distributed between the AP that allocates a resource unit for DiL transmission and a first (source) P2P station (registered to the AP) that controls P2P transmission over the DiL RU with a second (destination) P2P station. For instance, the first P2P station uses the DiL RU to transmit P2P data and subleases part of the allocated bandwidth to the second P2P station for response frame transmission.

The allocation of the DiL RU is performed by a triggering frame, either a trigger frame or a data or control frame including a trigger resource scheduling (TRS) subfield as defined in the 802.11ax standard.

To that end, the triggering frame sent by the AP is enhanced to allocate an RU of the MU transmission to DiL. As a result, the triggering frame offers Direct Link (DiL) transmission capabilities within the MU scheme, in addition to conventional MU Down Link (DL) and Uplink (UL) capabilities.

As will be described in more detail here below, the first P2P station that has been allocated a DiL RU by the AP may perform time sharing of the DiL RU with the second P2P station. Both P2P stations may thus exchange data in a peer-to-peer scheme using the DiL RU.

The first P2P station uses the P2P capability offered during the triggered MU transmission to send a P2P data frame. Also, the second P2P station may then receive the P2P data frame over the DiL RU allocated and responds with a P2P response frame towards the first P2P station, still over the DiL RU.

In the present document, "DiL RU" or "P2P RU" refers to a resource unit so allocated for Direct Link transmission.

FIGS. 2c and 2d illustrate such trigger-based (TB) P2P transmission during a transmission opportunity (TXOP) 241. In this example, the P2P transmission 221 is triggered by a triggering frame 211 that may be a trigger frame or a control or data frame containing a TRS subfield. It is assumed that the P2P transmission occupies the overall operating frequency band, e.g. 20 MHz as shown in the example, however other frequency bands, such as 40 MHz, 80 MHz, 80+80 MHz and 160 MHz may be envisioned.

Although one DiL RU 261 is depicted in the Figure, more DiL RUs may be provided by the same triggering frame 211 to various P2P stations. Preferably each, DiL RU is made of one or more 20 MHz channels as defined in 802.11.

Triggering frame 211 conveys the signaling of such DiL RU or RUs. For instance, one bit may be used to signal an RU over the overall operating band as being dedicated to DiL.

AP 110 transmits triggering frame 211 on the overall operating frequency band, i.e. 20 MHz in this example, based on the nominal frequency of its internal reference clock. As specify in the 802.11ax standard, the tolerance on this nominal frequency is ±20 ppm in the 5 GHz and 6 GHz bands.

Then, upon receiving triggering frame 211 from AP 110, the P2P STA1 is able to determine whether it is allocated a DiL RU, and in the affirmative which resource unit.

P2P STA1 uses a first part of the allocated DiL RU 261 to transmit a physical protocol data unit (P2P PPDU) 221 to P2P STA2. Then, P2P STA2 uses a second part over time of the DiL RU 261 to transmit a response frame 231, such as an acknowledgment (ACK) frame. Usually, P2P STA1 determines the first part based on the whole TXOP by letting enough time (second part) for the acknowledgment, the size of which is known.

P2P STA1 can transmit its P2P PPDU frame 221 based on the nominal frequency of its internal clock. Indeed, as there is no simultaneous transmission, there is no need of seeking orthogonality with another transmission.

The tolerance on its transmit frequency is usually ±20 ppm (5 GHz or 6 Ghz bands used).

P2P STA2 transmits its response frame 231, for example an ACK frame, based on the nominal frequency of its internal clock. The tolerance on its transmit frequency is also ±20 ppm (5 GHz or 6 Ghz bands used).

In order to improve spectrum efficiency, latency and overall useful data throughput even more further, one may consider combining MU UL and DiL RUs during the same MU transmission. In other words, it is now considered having MU transmissions as represented in FIGS. 2a, 2b together with P2P transmissions as represented in FIGS. 2c, 2d that are triggered simultaneously by the same AP using the same triggering frame.

Preferably, the UL transmission and the P2P transmission occur on two or more adjacent channels. Preferably, the P2P transmissions occupy one or more entire channels.

In other words, a triggering frame reserving a transmission opportunity, TXOP, is sent by an AP. The triggering frame allocates one (or more) DiL resource unit, RU, to a first P2P STA for direct link, DiL, communication (with a second P2P STA) and defines one or more uplink, UL, RUs adjacent to the DiL RU for UL communication during a specified UL duration. Usually, the triggering frame is duplicated over each 20 MHz channel forming the operating band.

During the specified UL duration, triggered non-AP stations transmit HE TB PPDUs over the UL RUs of a first 20 MHz channel while the first P2P STA transmits P2P PPDUs over the DiL RU of an adjacent 20 MHz channel.

However, such simultaneous MU UL and P2P transmissions from multiple (usually non-AP) stations on adjacent channels face some interference issues, in particular with respect to the orthogonality of the signals simultaneously transmitted by the multiple stations.

Indeed, even if adjacent 20 Mhz (or more) channels are spaced by some guard tones, they can be affected by Adjacent Channel Interference (ACI). The ACI happens when there is a lack of orthogonality between the communications occurring over the adjacent channels. The ACI level mainly depends on the distance between stations, the transmission power, the antenna patterns and the accuracy in time and frequency of the transmitters involved on the adjacent channels.

A main reason of a lack of orthogonality is due to the difference between the nominal frequencies of the various transmitting stations within the wireless communication network. As mentioned earlier, the 802.11ax standard, draft version 7.0 (D7.0) of November 2020, specifies a tolerance of ±20 ppm in the 5 GHz and 6 GHz bands for the symbol clock frequency and the transmit center frequency to be used by the transmitting stations (except for the transmission of HE TB PPDU format which is subject to additional requirements). As an example, in the 5 GHz band, this results in a frequency uncertainty of ±120 kHz for a given transmitting station. In view of the subcarrier spacing of 78.125 KHz defined in the 802.11ax standard, this uncertainty is not negligible.

Carefulness is thus required when combining MU UL and P2P transmissions. In particular, the second P2P station, P2P STA2 in the example above, which may even not be associated with the AP, is far from being synchronized with the AP. However, P2P STA2 may naturally be involved in transmissions simultaneous to the AP.

Based on the examples above, let assume STA3 and STA4 transmit HE TB PPDU frames 220 over two UL RUs 260 and 270 of a first 20 MHz channel and STA1 transmits P2P PPDU frame 221 over a second 20 MHz channel adjacent to the first channel using the $1^{st}$ option described previously, i.e. based on the nominal frequency of its internal clock. The transmitted frames 220 and 221 may then interfere one with each other. This is because they are not orthogonal due to the use respectively of a pre-corrected frequency within a ±350 Hz window from the AP's frequency for STA3 and STA4, and of the nominal transmit frequency for STA1 with a tolerance of ±20 ppm (5 GHz or 6 GHz band used).

Furthermore, once the MU UL length 250 ends, AP 110 transmits multi-station block ack frame 230 over the whole first 20 MHz channel while STA2 transmits Ack frame 231 over the second 20 MHz channel adjacent to the first 20 MHz channel. Again, the transmitted ack frames 230 and 231 may interfere one with each other. This is again because they are not orthogonal due to the use of different nominal transmit frequencies: the nominal transmit frequency of AP 110 and the nominal transmit frequency of STA2 which may have a maximum deviation of 40 ppm (5 GHz or 6 GHz band used).

In the current state of 802.11be developments, the orthogonality of simultaneous MU UL and P2P transmissions triggered by the same triggering frame cannot be guaranteed. Hence, the efficiency of the wireless network is substantially degraded.

It is thus an object of the present invention to provide, under AP's scheduling, simultaneous MU UL and P2P communication schemes reducing, or mitigating, interference issues over adjacent channels between transmitting stations, in particular with respect to the acknowledgment frames.

Figures 4A, 4B:
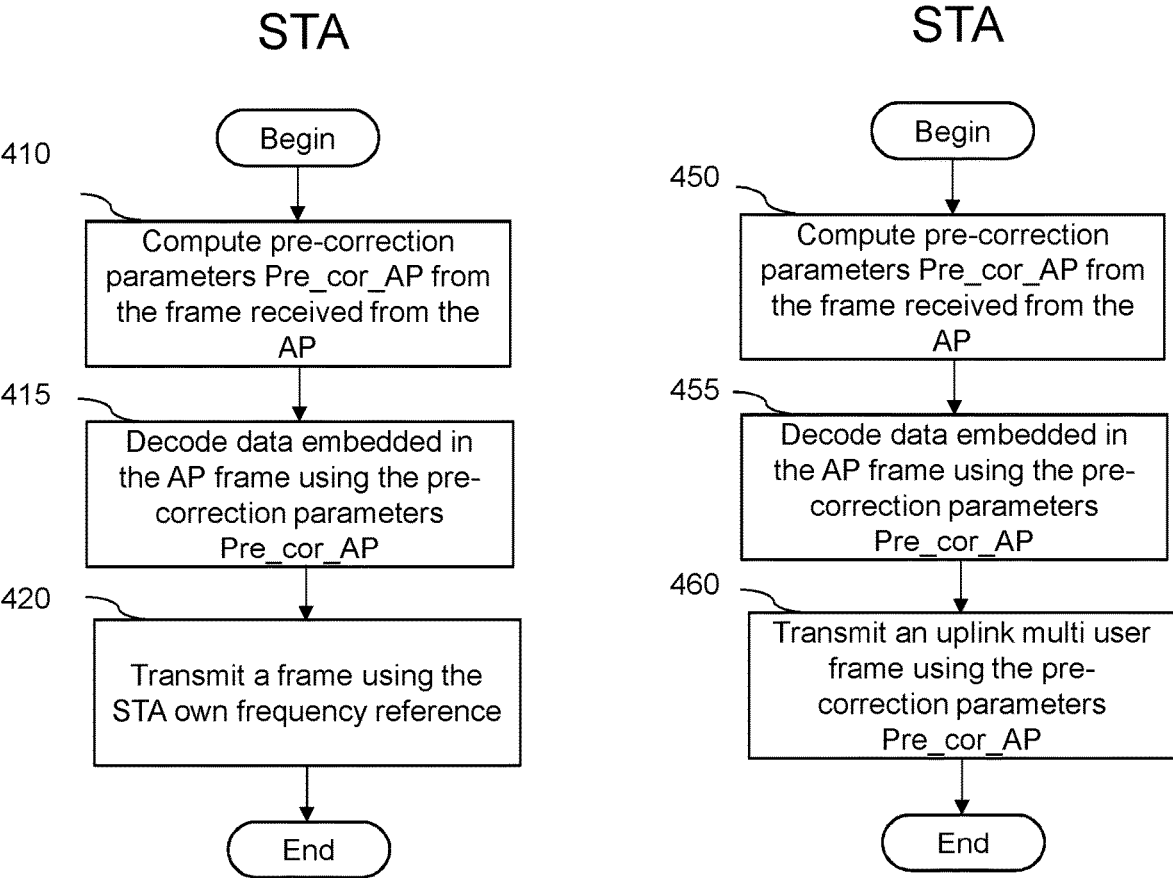
FIG. 4a illustrates using a flowchart the behavior of a STA involved in a Single User communication as defined in standard 802.1 lax.
FIG. 4b illustrates using a flowchart the behavior of a STA involved in a Multi User Up Link communication as defined in standard 802.11ax.

FIGS. 4a and 4b illustrate the behavior of a STA with regard to its transmission mode as defined in standard 802.11ax.

FIG. 4a illustrates the behavior of a STA when it communicates in Single User mode with an access point AP as defined in standards 802.11ax.

At step 410, the STA uses the preamble parts L-STF, L-LTF of the frame received from the AP to detect the packet, to tune the automatic gain control, to estimate frequency offset and the time synchronization. This leads to the determination of the parameters "Pre_cor_AP" named pre-correction parameters in the standard 802.11ax.

At step 415, the STA applies the parameters Pre_cor_AP to tune its frequency reference and its timing base to allow a proper decoding of the data sent by the AP.

At step 420, the STA sends a frame to the AP using its own frequency reference and timing base without adjusting them to signals received from the AP. They are based on the nominal frequency of its internal clock which has an accuracy defined in the standard of ±20 ppm (for 5 GHz or 6 Ghz bands).

It may be noted that the STA finely synchronizes itself on the AP at reception of a frame to allow the decoding of the frame but not for transmission. This is fine as, in SU scheme, there is not risk of interference for the transmission. Moreover, as the mode of transmission is SU, the AP can synchronize itself on the frame received from the STA (using also the preamble parts of the STA frame) in order to decode it properly although the low accuracy of the STA frequency reference used.

FIG. 4b illustrates the behavior of a STA when it communicates in Multi User Up Link OFDMA mode with an access point as defined in standard 802.11ax.

At step 450, the STA uses the preamble parts L-STF, L-LTF of the frame received from the AP to detect the packet, to tune the automatic gain control, to estimate frequency offset and the time synchronization. This leads to the determination of the pre-correction parameters "Pre-_cor_AP".

At step 455, the STA applies the parameters Pre_cor_AP to tune its frequency reference and its timing base to decode the data sent by the AP.

At step 460, the STA still applies the parameters Pre-_cor_AP to tune its frequency reference and its timing base to send an Uplink multi user frame to the AP. Thus, as specified in the standard 802.11ax for the transmission of HE TB PPDU, its frequency reference is in a ±350 Hz window from the AP's nominal frequency and its transmission start time remains within a ±4 μs+SIFS window from the end of the received frame.

In MU UL OFDMA scheme, as several stations transmit simultaneously data frames to the AP, these transmissions have to be finely synchronized in order to preserve a good level of orthogonality between the subcarriers of the different RUs used for the transmissions and therefore a proper decoding of all the frames by the AP. As all STA's involved in this MU UL OFDMA transmission follow this behavior, they emit their frames with frequency and time references closed from those of the AP and the AP is able to decode the multiple frames properly.

In order to improve spectrum efficiency, latency and overall useful data throughput even more further, one may consider allowing MU transmissions as represented in FIGS. 2a, 2b and P2P transmissions as represented in FIGS. 2c, 2d to be triggered by a same AP, for example on 2 adjacent channels.

However, such simultaneous MU and P2P transmissions from several distinct stations on adjacent channels will face to some interference issues if these concurrent transmissions are not orthogonal.

As example, with reference to the FIGS. 2a, 2b and 2c, 2d, the transmission of the HE TB PPDU frames 220 over a first channel by the STA3 and STA4 and the transmission of the P2P PPDU frame 221 over a second channel adjacent to the first channel by the STA1 using the 1st option described previously (i.e. STA 1 transmits its P2P PPDU frame based on the nominal frequency of its internal clock) will interfere each other. Indeed, as the transmissions of these HE TB PPDU frames 220 and P2P PPDU frames 221 are performed using respectively a pre-corrected frequency within a ±350 Hz window from AP's 110 frequency and as the transmit center frequency of STA2 has a tolerance of ±20 ppm (5 GHz or 6 GHz band used), the orthogonality of the subcarriers of the adjacent channels cannot be respected.

As another example, with reference to the FIGS. 2a, 2b and 2c, 2d, the transmission of the multi station block ack frame 230 over a first channel by the AP 110 and the transmission of the Ack frame 231 over a second channel adjacent to the first channel by the STA2 will interfere each other. Indeed, as the transmissions of these multi station block ack frame 230 and Ack frame 231 are performed using respectively the nominal frequencies of AP 110 and STA2 which may have a maximum deviation of 40 ppm (5 GHz or 6 GHz band used), the orthogonality cannot be guaranteed.

It is an object of the present invention to provide, under AP's scheduling, simultaneous MU and P2P communication schemes mitigating such interference issues between transmitting stations.

More particularly, it is an object of the present invention to provide, under AP's scheduling, simultaneous MU and P2P communication schemes mitigating interference issues between the transmission of the MU data frames and the P2P data frames and between the transmission of a multi station block Ack frame by the AP as part of the MU communication and the transmission of an Ack frame by a destination station as part of the P2P communication.

The communication scheme according to the present invention will described hereafter with reference to the FIGS. 5 to 7.

Figure 5A:
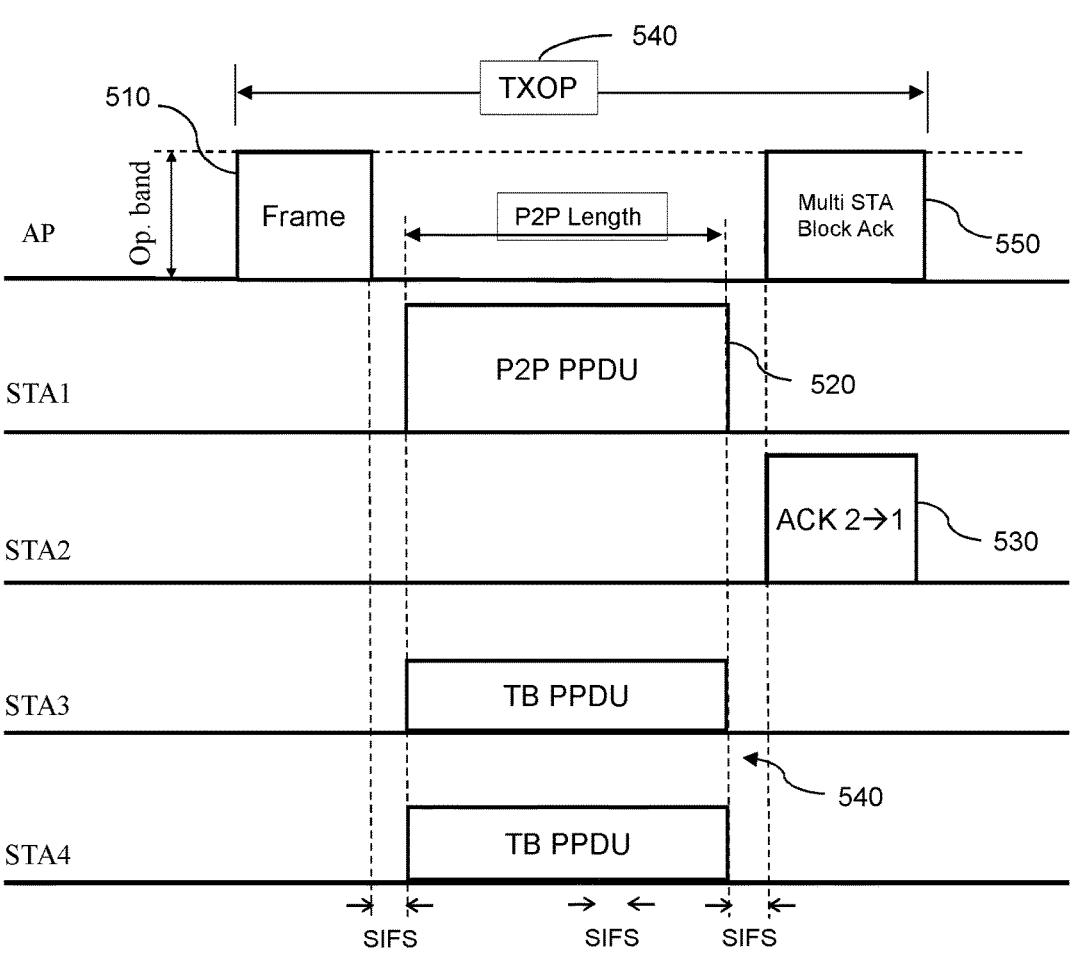
FIG. 5a illustrates, from stations perspective, a simultaneous trigger-based (TB) P2P transmission and trigger-based (TB) MU UL OFDMA transmission during a transmission opportunity (TXOP) according to embodiments of the invention.
Figure 5B:
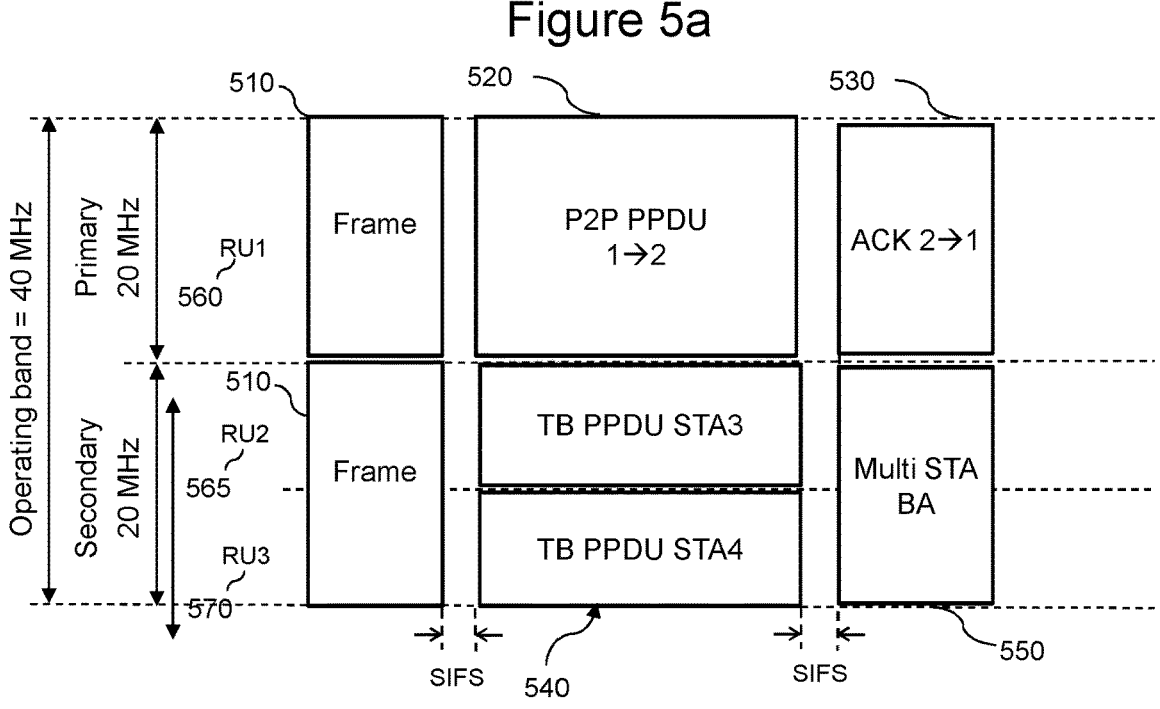
FIG. 5b illustrates, from the operating frequency band perspective, the TB P2P transmission and TB MU UL OFDMA transmission of FIG. 5a according to embodiments of the invention.

The FIGS. 5a and 5b illustrate, respectively from stations and operating frequency band perspective, a simultaneous trigger-based (TB) P2P transmission over a first channel and trigger-based (TB) MU UL OFDMA transmission over a second channel adjacent to the first channel during a transmission opportunity (TXOP) according to a 1st and 2nd embodiment of the invention.

In these two embodiments, the TB P2P transmission is performed in a primary 20 MHz channel and the TB MU UL OFDMA transmission is performed in an adjacent secondary 20 MHz channel. This example of primary and secondary channels mapping for the TB P2P transmission and the TB MU UL OFDMA transmission is not limitative and other primary and secondary channels mapping could be used either based on the same channel width of 20 MHz or based on higher channel widths such as 40 MHz, 80 MHz or 160 MHz.

The TB P2P transmission and the TB MU UL OFDMA transmission are triggered simultaneously by the triggering frame 510 sent by the AP 110; the TB P2P transmission and the TB MU UL OFDMA transmission occur simultaneously as well as the transmission of the ACK frames by the AP and the P2P destination STA.

As explained in the chapter "background of the invention", such simultaneous MU and P2P transmissions from several distinct stations on adjacent channels may face to some interference if the orthogonality of the subcarriers transmitted is not respected, which occurs particularly if the frequency references used by the STA are not close. For instance, if the frequency deviation is 40 ppm (maximum value specified by the standard) it leads to a frequency deviation of 240 KHz (for the 6 GHz channel) between the two carrier frequencies transmitted. As the subcarriers spacing in 802.11ax is 78.125 kHz, this frequency deviation is higher than three subcarrier spacings and it breaks the orthogonality of the subcarriers.

One aim of the current invention is to enable the simultaneous MU and P2P transmissions on adjacent channels while mitigating the potential interferences.

Then, according to embodiments of the invention, the behaviors of the P2P STA's are set in this way:

According to a first aspect of the invention, the P2P source STA behavior is the one specified for the Multi User Up Link communication mode in the 802.11ax standard regarding synchronization. The P2P source STA sends the frame towards the P2P destination STA using the pre-correction parameters Pre_cor_AP computed from the frame received from the AP. Thanks to this behavior, the orthogonality of the subcarriers of the P2P PPDU frame 520 and the subcarriers of the TB PPDU frame 540 is respected as both frames are generated with regard to the AP frequency reference.

According to a second aspect of the invention, the P2P destination STA behavior is modified to synchronize the transmission of the P2P ack frame 530 with the transmission of the multi STA block ack 550 by the AP. Different alternative embodiments of this synchronization are proposed.

In a first embodiment, the behavior of the P2P destination STA is also the one specified for Multi User Up Link communication in 802.11ax standard. For transmitting a frame the P2P destination STA applies the pre-correction parameters computed from the last frame received. This means that, regarding the transmission of the P2P ack frame 530, the P2P destination STA applies the pre-correction parameters Pre_cor_SSTA computed based on the P2P source STA when receiving the P2P PPDU data frame.

Then it tunes its frequency reference in a ±350 Hz window from the frequency used by the P2P source STA. As the STA1 had itself determined its own pre-correction parameters to generate its frequency reference in a ±350 Hz window from the frequency used by the AP, the potential maximum offset between the frequency reference of the P2P destination STA and the AP is ±700 Hz.

Comparing this offset with the subcarrier spacing of 78.125 KHz, this offset is less than 2% and the orthogonality can be considered as respected.

In a second embodiment, the behavior of the P2P destination STA is similar to the previous one, excepted the fact that the pre-correction parameters it uses to generate its frequency reference are the ones it computed upon reception of a previous frame from the AP. In this case, the pre-correction parameters have been stored in a memory or a register and are read to tune the frequency reference used to send the ACK frame to the P2P source STA. As the pre-correction parameters used have been computed from a frame received from the AP, the frequency reference used for the ACK transmission is in a ±350 Hz window from the frequency used by the AP, thereby mitigating the interferences between the P2P destination STA and the AP transmissions.

With regard to the implementation of the STA receiver, the pre-correction parameters may take various forms: they may be a Carrier frequency Offset (CFO) value, a symbol clock offset (SCO) value, a phase value and so on. Whatever the meanings of the pre-correction parameters, they can be coded in digital words and stored in a memory in order to be used to tune the frequency reference of the STA when required.

It can be noticed that the second embodiment can be used only if the P2P destination STA is in the communication range of the AP as it shall receive at least an AP frame to compute the pre-correction parameters. This condition doesn't exist for the first embodiment.

In a third embodiment, the two above described embodiments are combined. In this third embodiment, the pre-correction parameters computed based on the reception of a previous frame from the AP are used when available. When they are not available, typically when the P2P destination STA is not in the communication range of the AP, the pre-correction parameters computed based on the reception of a previous frame from the P2P source STA is used. In a variant, the pre-correction parameters obtained on reception of an AP frame are considered as not available if too old. This may be done by timestamping the pre-correction parameters and by comparing the difference between the current time and the timestamp to a predefined threshold.

The transmission scheme illustrated in FIGS. 5a and 5b will now be described in detail.

The two P2P stations (STA1 and STA2) have established a direct link session prior to the simultaneous trigger-based (TB) MU UL and P2P transmissions sequence. The two other stations (STA3 and STA4) have some data to transmit to the AP 110.

In this example, the AP initiates a simultaneous TB MU UL and P2P transmissions sequence to share its gained TXOP 540 between the peers for a direct link transmission over a primary 20 MHz channel, and the two other STAs for MU UL transmission over the adjacent secondary 20 MHz channel.

To do so, the AP 110 creates, for instance, a triggering frame 510 indicating STA1 as the recipient of a RU 560 spanning the whole band of a primary 20 MHz channel and indicating STA3 and STA4 as the recipient of, respectively, a RU 565 and RU 570 sharing each other the whole band of the adjacent secondary 20 MHz channel.

The AP 110 transmits this triggering frame 510 over the overall operating frequency band which includes, in this example, both primary and secondary 20 MHz channels.

The triggering frame 510 generated and transmitted by the AP is not limited to a trigger frame, it could be also a HE MU PPDU frame containing some TRS control subfields addressed to the STA1, STA3 and STA4.

The allocated RUs for STA1, STA3 and STA4 may be signalled in different ways in the trigger frame or HE MU PPDU frame 510.

Regarding STA1, in the case of a trigger frame 510, the AP signals through one User info field 340 assigned to the STA1 the assigned RU 560 on the primary 20 MHz channel. The AP also mentions on that RU 560 that this is an RU dedicated for direct link transmission.

Several possibilities exist to signal the fact that an RU is dedicated to direct link transmissions. For example, in a trigger frame, one reserved bit 343 of the user info field 340 can be used to indicate a direct link RU. As another example, in a TRS subfield 350, the reserved bit 354 can be used to indicate a direct link RU.

Another possibility is to set the AID12 field 341 to a specific value indicating an RU for direct link. The AID of the station can then be encoded in a specific format in the trigger dependent info field 344, or in the user info field 340 itself, since several fields of the user info field 340 are meaningless in the case of the direct link transmission. It is then for example possible to reuse 12 bits (bits B20 to B31) of the user info field 340 to indicate one or more of the followings: the AID of the source station STA1, the AID of the destination station STA2, or an AID specific to the direct link session between those two peer stations STA1 and STA2.

Upon reception of triggering PPDU 510, STA1 determines that the AP allocated an RU 560 to it for direct link transmission (by reading the information associated with the allocated RU). STA1 then determines time TXTIME0 corresponding to the duration of the RU 560 allocated by the AP for the DiL communication.

Determination of TXTIME0 may be based on a UL Length field 320 included in a trigger frame or a UL Data Symbol subfield 351 and a UL HE MCS subfield 315 included in a TRS subfield 350. In a similar way to an MU UL transmission, these fields may be specified by the AP for an allocated P2P RU. By considering that, for synchronization purposes, all RUs during a same simultaneous MU UL and P2P transmission sequence has the same length, UL Length 332, UL Data Symbol 351 and UL HE MCS 353 can be used. As the RUs can be allocated for MU UL and for P2P transmissions according to embodiments of the invention, the subfields 332, 351 and 353 could be renamed to TB Length, TB Data Symbols and TB HE-MCS respectively. Otherwise, existing names for fields UL Length, UL Data Symbols and UL HE-MCS may still be used.

As an example of determination of TXTIME0 based on UL Length, we may use the following relation:

$$TXTIME0 = \frac{UL\_LENGTH}{3} * 4 + 24$$

Or the following to get UL Length based on TXTIME0:

$$UL\_LENGTH = \frac{TXTIME0 - 20}{4} * 3 - 3$$

TXTIME0 may also be determined based on the UL Data Symbol subfield 351 of the TRS subfield 350 that indicates the number of OFDM symbol of the Data portion of the HE TB PPDU, and on the UL HE MCS field 353 (the HE TB PPDU preamble size being known).

STA1 determines the optimum MCS value to transmit data to STA2 based for example on the SNR measured during a latest past transmission received from STA2. This determined MCS value or a predefined default MCS value can be used by the destination STA2 for the transmission of the Ack frame 431 to the source STA1. The determined MCS value and TXTIME0 allow to compute the quantity of data that can be sent by the source STA1 to the destination STA2.

The source STA1 then creates the P2P PPDU 520 and transmits it on the RU 560 allocated by the AP 110. The source STA1 transmits this P2P PPDU 520 using the same rules specified in the 802.11ax standard for the transmission of a HE TB PPDU frame, i.e. with a pre-corrected transmit frequency within a ±350 Hz window from nominal frequency of the AP 110 (which enables the orthogonality of the subcarriers transmitted by the STA's).

The destination STA2, after receiving the P2P PPDU 520 on the RU 560, decodes the PPDU, generates the acknowledgment packet 530, and transmits it, a SIFS duration after the end of the P2P PPDU 520 reception time, on the same RU 560.

With regards to the implemented embodiments of the invention, the P2P destination STA2 transmits this response frame 530 using a frequency reference based on the pre-correction parameters determined either from the AP received frame or from the P2P source STA received frame.

Regarding STA3 and STA4, their respective allocated UL RUs may be signalled by the AP 110 in different ways through the triggering HE MU PPDU frame 510.

Upon reception of the triggering HE MU PPDU 510, if stations STA3 and STA4 are identified as destinations of a MU DL transmission (unique identifier AID of the station listed in the HE SIG-B part of the physical preamble, or AID in the preamble identifying a broadcast Resource Unit), the stations decode the received MSDU, and the included TRS subfield 350. If the received HE MU PPDU contains a trigger frame, stations STA3 and STA4 are identified as intended receivers of a User Info field 340 in a trigger frame 410 (i.e., the AID12 subfield 341 equal to the 12 LSBs of the AID of the Station). Each station STA3 and STA4 then decodes the associated User info field 340.

Based on the TRS control subfield 350 or the trigger frame and User info field 340, each station determines the Resource Unit (RU) assigned to it, as well as the associated transmission parameters values (fields e.g. MCS, Target RSSI, etc.).

Then, each station generates a packet to be transmitted on the assigned RU. For that, the station first determines the transmission time (TXTIME0) that is granted by the AP. The determination may be performed similarly to what have been discussed above, using either UL Length 332 or UL Data Symbols 351 and UL HE MCS 353 subfields. Secondly, based on the MCS indicated by the AP and TXTIME0, the station determines the quantity of data that can be transmitted and generates the MSDU packet (containing payload data for example). The MSDU packet is then encapsulated in the HE TB PPDUs 540 and transmitted, a SIFS duration after the end of the reception of the triggering HE MU PPDU 510.

The STA3 and STA4 transmit their HE TB PPDU frames 540, on their respective allocated RU 565 and 570 over the secondary 20 MHz channel, using a pre-correction of their nominal frequency to be within a ±350 Hz window from nominal frequency of the AP 110, as specified in the 802.11ax standard for the transmission of HE TB PPDU.

After the transmission of the triggering HE MU PPDU 510, the AP 110 listens the medium, waiting for the reception of HE TB PPDUs frames 540 from STA3 and STA4. During the transmission period of the HE TB PPDUs 540, the AP decodes the PPDUs (that are all intended to it). A SIFS duration after the end of the HE TB PPDUs transmission, the AP is allowed to take the medium again, and use it to sends a multi station block Ack frame 550 to acknowledge all the HE TB PPDUs received.

FIG. 6a illustrates using a flowchart an example of a wireless communication method performed by an AP according to embodiments of the invention.

At step 601, the AP transmits a frame allocating, in a first channel, a P2P RU to a source station (e.g. STA1) and, in a second channel adjacent to the first channel, several MU UL RUs to other stations (e.g. STA3 and STA4). This transmitted frame provides also a length indication to the stations (e.g. STA1, STA3 and STA4). As discussed previously, allocation of the P2P RU, the MU UL RUs and the length indication may be included in a trigger frame or in a trigger resource scheduling (TRS) field of a data or control frame received from the AP.

At the step 602, the AP receives MU UL frame from the other stations (e.g. STA3 and STA4). As discussed previously, MU UL frame may be HE TB PPDUs.

At the step 603, the AP generates and transmits a MU DL frame towards other stations (e.g. STA3 and STA4). The transmission of MU DL frame is made over the second channels. In a variant, the transmission of this MU DL frame is performed over both first and second channels, typically in case where the P2P transmission does not require an ack frame transmission from the P2P destination station back to the P2P source station.

FIG. 6b illustrates using a flowchart an example of a wireless communication method performed by a P2P source station according to embodiments of the invention. The P2P source station (e.g. STA1) is considered to have an established direct link (also called P2P) session with a P2P destination station (e.g. STA2).

At step 650, the P2P source station (e.g. STA1) receives, from the AP, an allocation of a P2P RU in a first channel and an indication of length. As discussed in previous embodiments, these information are received from the AP through a trigger frame or in a trigger resource scheduling (TRS) field of a data or control frame.

At step 655, the P2P source station (e.g. STA1) computes, based on the received length indication of a second frame, the transmission time to be used to transmit a first frame.

At step 660, the source station (e.g. STA1) transmits, to a destination station (e.g. STA2), the first frame over a first part of the allocated P2P RU. As discussed in the previous embodiments, the source station (e.g. STA1) transmits the first frame using pre-correction parameters computed based on a previously received frame from the AP, typically the triggering frame received at step 650. The transmission is therefore made with a pre-corrected transmit frequency within a ±350 Hz window from nominal frequency of the AP. The first frame may be a P2P PPDU frame.

At step 665, the P2P source station (e.g. STA1) receives a second frame from the P2P destination station (e.g. STA2) over a second part of the P2P RU allocated to the source station (e.g. STA1). As discussed in the previous embodiments, the second frame may be a response frame or an Ack frame to the first frame transmitted by the P2P source station (e.g. STA1).

Figures 7A, 7B:
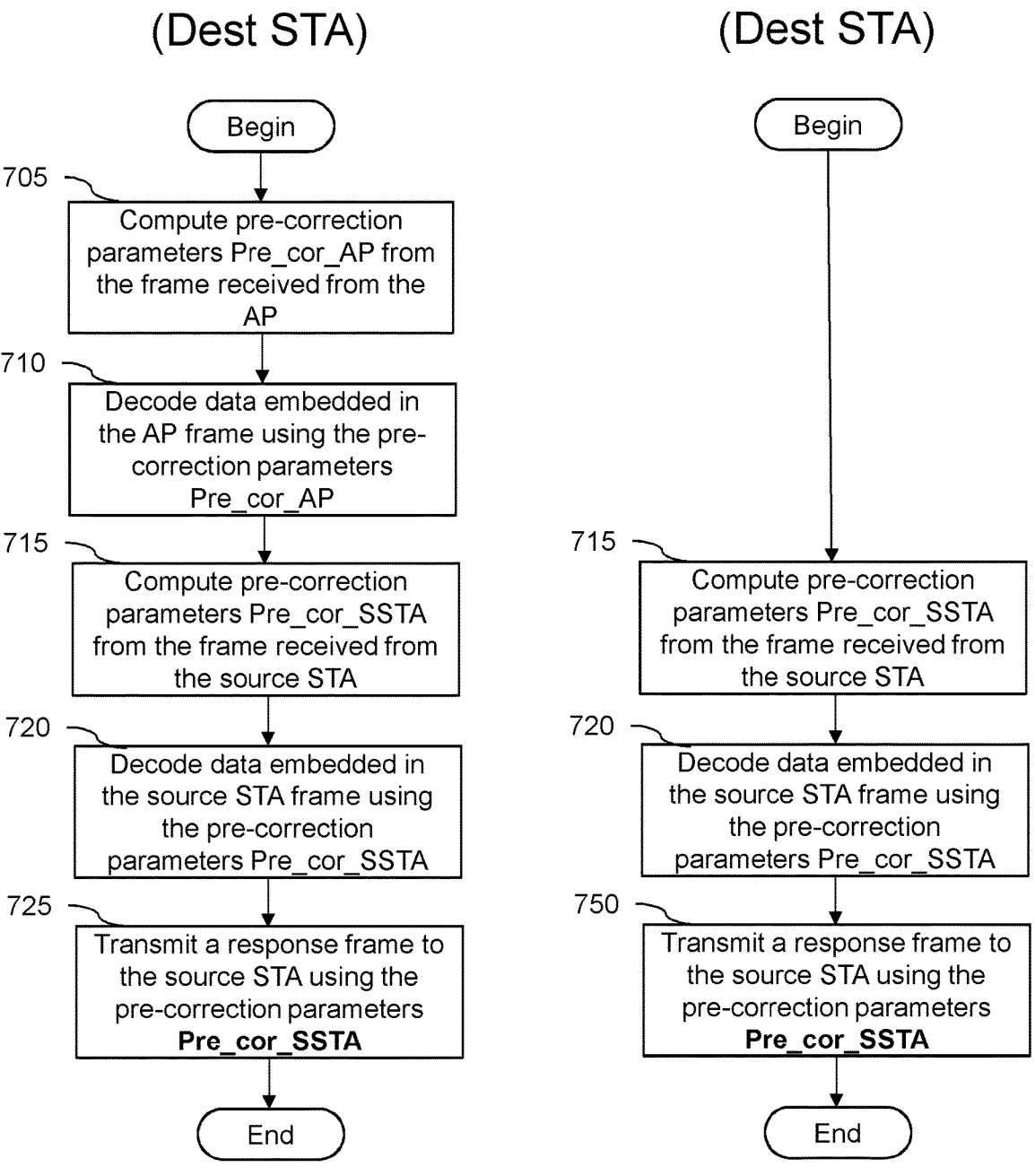
FIG. 7a, FIG. 7b and FIG. 7c illustrate using a flowchart an example of a wireless communication method performed by a P2P destination station according to embodiments of the invention.

FIG. 7a illustrates using a flowchart an example of a wireless communication method performed by a P2P destination station according to a first embodiment of the invention. In this embodiment, the P2P destination station is in range of the AP and then it receives the AP frame and decode it at least partially (at least to determine if it is a destination of this frame).

The P2P destination station (e.g. STA2) is considered to have an established direct link (also called P2P) session with a P2P source station (e.g. STA1).

At step 705, the P2P destination station receives a frame transmitted by the Access point AP and computes the pre-correction parameters Pre_cor_AP from its preamble.

At step 710, the P2P destination station applies the pre-correction parameters Pre_cor_AP to tune its internal frequency and time references and to decode the data sent by the AP. This step is optional as the P2P destination station may not be a recipient of the AP frame.

At step 715, the destination station receives a frame transmitted by the P2P source station (e.g. STA1) and computes the pre-correction parameters Pre_cor_SSTA from its preamble.

At step 720, the P2P destination station applies pre-correction parameters Pre_cor_SSTA to tune its internal frequency and time references and to decode the data sent by the P2P source station (e.g. STA1).

At step 725, the P2P destination station still applies the pre-correction parameters Pre_cor_SSTA to tune its internal frequency and time references, to generate a frame (e.g. a response frame or an Ack frame) and to transmit it bound for the P2P source station (e.g. STA1).

It is to be noted that, while being in the range of the AP, in this first embodiment, the P2P destination station uses the pre-correction parameters computed based on the P2P source station and not the pre-correction parameters computed based on the AP.

FIG. 7b illustrates using a flowchart an example of a wireless communication method performed by a P2P destination station according to the first embodiment of the invention in the context where the P2P destination station is not in range of the AP. The P2P destination station received only frames coming from the P2P source station (and eventually from AP or other stations from another BSS).

The P2P destination station (e.g. STA2) is considered to have an established direct link (also called P2P) session with a P2P source station (e.g. STA1).

At step 715, the P2P destination station receives a frame transmitted by the P2P source station (e.g. STA1) and computes the pre-correction parameters Pre_cor_SSTA from its preamble.

At step 720, the P2P destination station applies the pre-correction parameters Pre_cor_SSTA to tune its internal frequency and time references and to decode the data sent by the source station (e.g. STA1).

At step 750, the P2P destination station still applies the pre-correction parameters Pre_cor_SSTA to tune its internal frequency and time references, to generate a frame (e.g. a response frame or an Ack frame) and to transmit it to the P2P source station (e.g. STA1).

It is to be noted that the behavior of the P2P destination station is similar to the one illustrated by FIG. 7a with the difference that pre-correction parameters computed based on the AP is no longer available. Therefore, the choice of the pre-correction parameters computed based on the P2P source station is here the only possible choice for finely synchronize the transmission from the P2P destination station back to the P2P source station, which itself is finely synchronized with the AP.

Figure 7C:
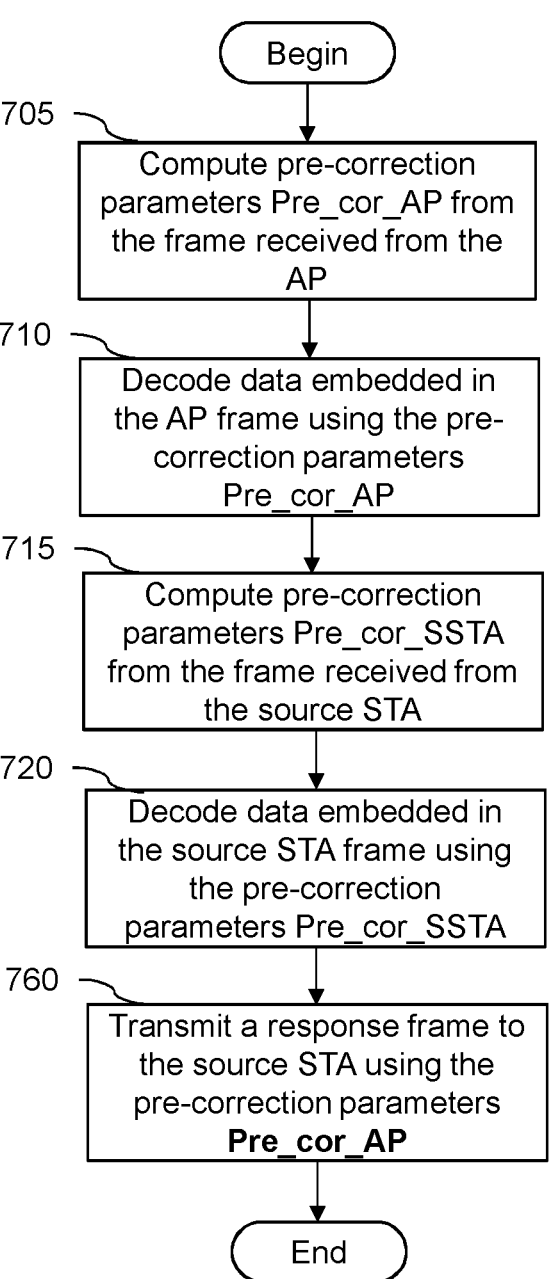

FIG. 7c illustrates using a flowchart an example of a wireless communication method performed by a P2P destination station according to the second embodiment of the invention.

As for FIG. 7a, in this embodiment, the P2P destination station is in range of the AP and then it receives the AP frame and decode it at least partially (at least to determine if it is a destination of this frame).

The four first steps of the flowchart are identical to those of FIG. 7a.

The last step, step 760, is different:

In this step 760, instead of using the pre-correction parameters Pre_cor_SSTA to tune its internal frequency and time references, the P2P destination station used the pre-correction parameters Pre_cor_AP it computed during the step 705 from the preamble of the frame received from the AP.

The pre-correction parameters Pre_cor_AP computed at the reception of the preamble of the received frame from the AP have been stored in a memory or register or any memory mean and are restored to tune the internal frequency and time references of the destination station when it generates and transmits its frame (e.g. response frame or Ack frame).

It may be seen that, by adopting for the P2P source station the behavior prescribed for the MU UL transmitting station, for the transmission of the data frames to the P2P destination station, and by adopting the pre-correction by the P2P destination station when transmitting back frames to the P2P source station, whether the pre-correction parameters are based on the AP or the P2P source station, all the P2P frames are finely synchronized on the AP frequency and may be transmitted simultaneously to MU traffic while preserving the orthogonality between the adjacent channels and mitigating the interferences.

Figure 8A:
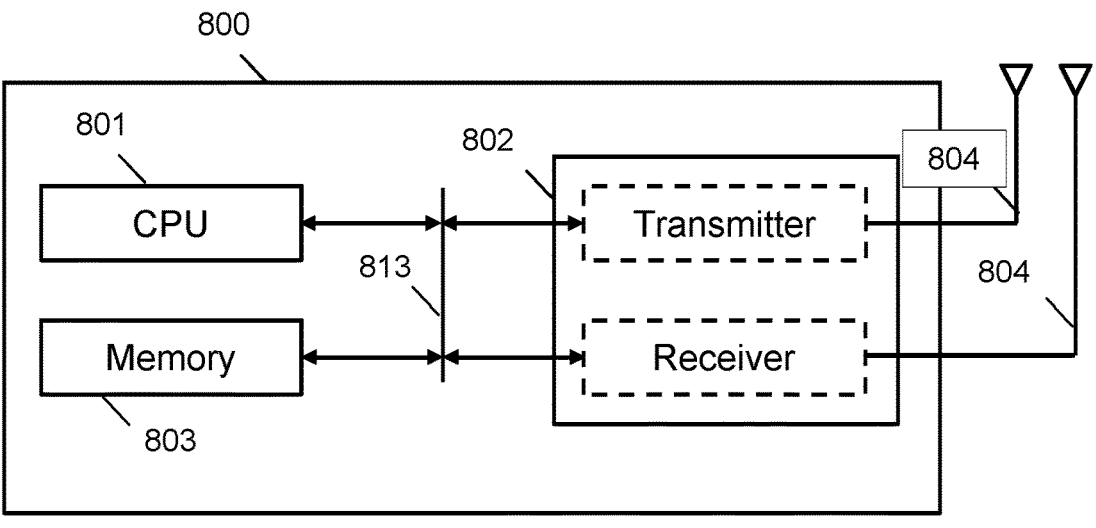
FIG. 8a shows a schematic representation of the hardware of a communication device in accordance with embodiments of the invention.

FIG. 8a schematically illustrates a communication device 800, either a non-AP station 101-107 or the access point 110, of the radio network 100, configured to implement at least one embodiment of the present invention. The communication device 800 may preferably be a device such as a micro-computer, a workstation or a light portable device. The communication device 800 comprises a communication bus 813 to which there are preferably connected:

> a central processing unit 801, such as a processor, denoted CPU;
> a memory 803 for storing an executable code of methods or steps of the methods according to embodiments of the invention as well as the registers adapted to record variables and parameters necessary for implementing the methods; and
> at least one communication interface 802 connected to a wireless communication network, for example a communication network according to one of the IEEE 802.11 family of standards, via transmitting and receiving antennas 804.

Preferably the communication bus provides communication and interoperability between the various elements included in the communication device 800 or connected to it. The representation of the bus is not limiting and in particular the central processing unit is operable to communicate instructions to any element of the communication device 800 directly or by means of another element of the communication device 800.

The executable code may be stored in a memory that may either be read only, a hard disk or on a removable digital medium such as for example a disk. According to an optional variant, the executable code of the programs can be received by means of the communication network, via the interface 802, in order to be stored in the memory of the communication device 800 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

Figure 8B:
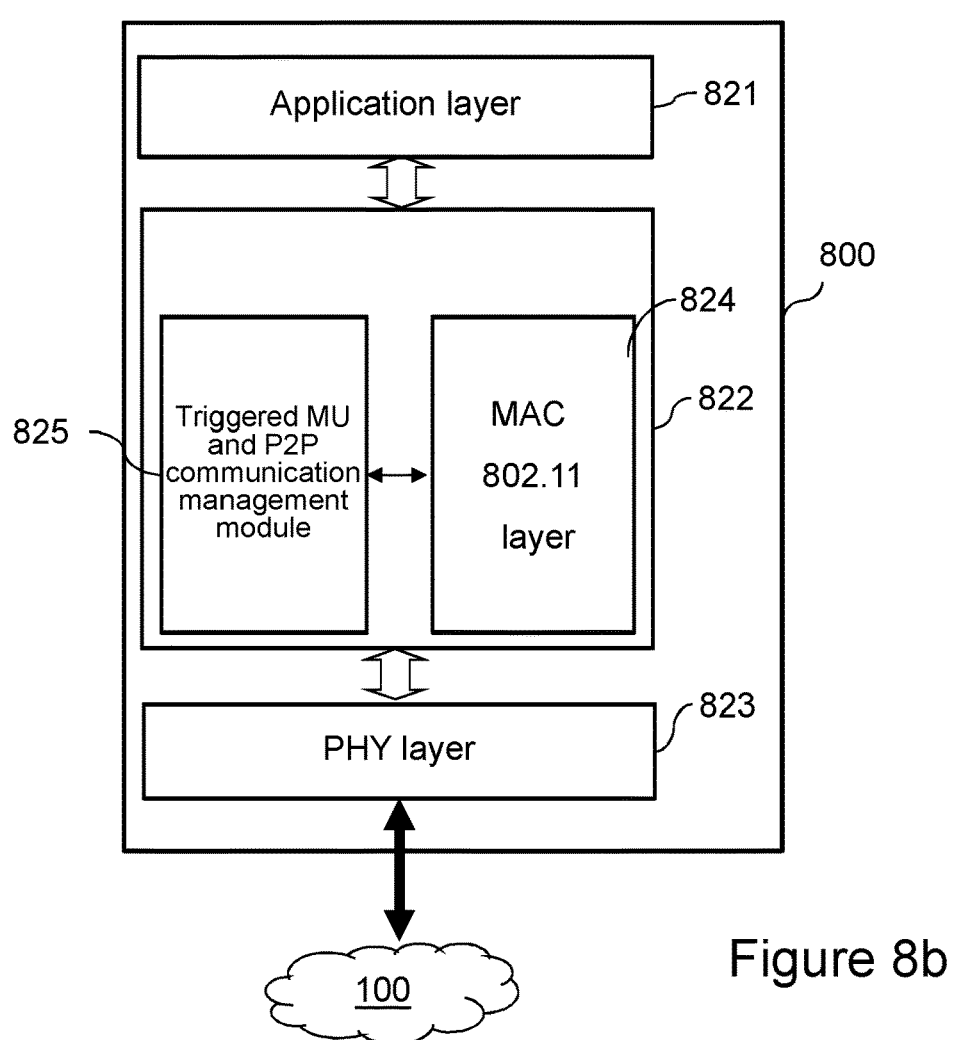
FIG. 8b shows a schematic representation of the software architecture of a wireless communication device in accordance with embodiments of the invention.

FIG. 8b is a block diagram schematically illustrating the software architecture of the communication device 800, either AP 110 or one of stations 101-107, adapted to carry out, at least partially, the invention. As illustrated, device 800 comprises a physical (PHY) layer block 823, a MAC layer block 822, and an application layer block 821.

The PHY layer block 823 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 210 (FIG. 2a) to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 822 preferably comprises an 802.11 MAC layer 824 implementing conventional 802.11ax MAC operations, and additional block 825 for carrying out, at least partially, the invention. The MAC layer block 822 may optionally be implemented in software, which software is executed by CPU 801.

Preferably, the additional block 825, referred to as Triggered MU and P2P communication management module for handling simultaneous triggered MU and P2P transmissions over adjacent channels following a medium access triggering frame, implements the part of embodiments of the invention (either from station perspective or from AP perspective).

With regard to the embodiment of the invention, the PHY layer block 823 may have been modified in order to store the pre-correction parameters computed at the reception of a frame for later use.

802.11 MAC layer 824, Triggered MU and P2P communication management module 825 interact one with the other in order to process accurately communications over OFDMA RU addressed to multiple stations according to embodiments of the invention.

On top of the Figure, application layer block 821 runs an application that generates and receives data packets, for example data packets such as a video stream. Application layer block 821 represents all the stack layers above MAC layer according to ISO standardization.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network, at a peer-to-peer source station comprising:

> receiving from an access point a triggering frame reserving a transmission opportunity, the triggering frame allocating a first resource unit to the peer-to-peer source station for a direct link communication with a peer-to-peer destination station, the triggering frame further allocating at least one second resource unit for uplink communication to at least one station in multi user mode;

transmitting to the peer-to-peer destination station a frame on the first resource unit;

computing pre-correction parameters based on the received triggering frame from the access point; and applying the pre-correction parameters when transmitting to the peer-to-peer destination station the frame on the first resource unit.

2. The method of claim 1, wherein the pre-correction parameters are related to a transmit center frequency and symbol clock frequency error compensation.

3. The method of claim 1, wherein applying the pre-correction parameters comprising pre-correcting a center frequency of the transmitted frame from a nominal transmit center frequency used by the access point to transmit the triggering frame, preferably the transmit center frequency is pre-corrected within a $\pm 350$ Hz window from the nominal transmit center frequency and the frame is transmitted within a SIFS $\pm 0.4$ $\mu$s period from an end of the triggering frame.

4. A communication method in a wireless network, at a peer-to-peer destination station comprising:

transmitting to a peer-to-peer source station a second frame on a first resource unit allocated for a direct link communication with the peer-to-peer source station by a triggering frame transmitted by an access point, the triggering frame further allocating to at least one station at least one second resource unit for uplink transmission in multi user mode;

computing pre-correction parameters based on a previously received frame for guaranteeing that simultaneous transmission of the second frame by the peer-to-peer destination on the first resource unit for direct link communication and a transmission on the second resource unit for uplink transmission are synchronized; and applying the pre-correction parameters when transmitting the second frame to the peer-to-peer source station on the first resource unit.

5. The method of claim 4, further comprising receiving from the peer-to-peer source station a first frame and wherein the previously received frame is the first frame received from the peer-to-peer source station.

6. The method of claim 4, wherein:

the peer-to-peer destination station is within a radio range of the access point to which the peer-to-peer source station is connected; and the previously received frame is the triggering frame transmitted by the access point.

7. The method of claim 6, wherein the previously received frame is the last received frame from the access point.

8. The method of claim 4, wherein the pre-correction parameters applied when transmitting to the peer-to-peer source station the second frame are:

the pre-correction parameters computed based on the previously received frame from the access point when available; and the pre-correction parameters computed based on a first frame received from the peer-to-peer source station otherwise.

9. The method of claim 4, wherein the pre-correction parameters are related to a transmit center frequency and symbol clock frequency error compensation.

10. The method of claim 4, wherein applying the pre-correction parameters comprising pre-correcting a center frequency of the transmitted second frame from a nominal transmit center frequency, the nominal transmit center frequency being used either by the peer-to-peer source station to transmit a frame or by an access point to transmit a frame.

11. The method of claim 10, wherein the center frequency of the transmitted second frame is pre-corrected within a $\pm 350$ Hz window from the nominal transmit center frequency.

12. A non-transitory computer-readable storage medium storing instructions of a computer program that when executed by a processor implement the following operations:

receive from an access point a triggering frame reserving a transmission opportunity, the triggering frame allocating a first resource unit to the peer-to-peer source station for a direct link communication with a peer-to-peer destination station, the triggering frame further allocating at least one second resource unit for uplink communication to at least one station in multi user mode;

transmit to the peer-to-peer destination station a frame on the first resource unit;

compute pre-correction parameters based on the received triggering frame from the access point; and apply the pre-correction parameters when transmitting to the peer-to-peer destination station the frame on the first resource unit.

13. A communication device in a wireless network, capable of operating as a peer-to-peer source station, the communication device comprising a processor configured for:

receiving from an access point a triggering frame reserving a transmission opportunity, the triggering frame allocating a first resource unit to the peer-to-peer source station for a direct link communication with a peer-to-peer destination station, the triggering frame further allocating at least one second resource unit for uplink communication to at least one station in multi user mode;

transmitting to the peer-to-peer destination station a frame on the first resource unit;

wherein the method further comprises:

computing pre-correction parameters based on the received triggering frame from the access point; and applying the pre-correction parameters when transmitting to the peer-to-peer destination station the frame on the first resource unit.

14. A communication device in a wireless network, capable of operating as a peer-to-peer destination station, the communication device comprising a processor configured for:

transmitting to a peer-to-peer source station a frame on a first resource unit allocated for a direct link communication with the peer-to-peer source station by a triggering frame transmitted by an access point, the triggering frame further allocating to at least one station at least one second resource unit for uplink transmission in multi user mode;

computing pre-correction parameters based on a previously received frame for guaranteeing that simultaneous transmission of the frame by the peer-to-peer destination on the first resource unit for direct link communication and a transmission on the second resource unit for uplink transmission are synchronized; and applying the pre-correction parameters when transmitting to the frame to the peer-to-peer source station.

\* \* \* \* \*